United States Patent
Lohr et al.

(10) Patent No.: US 8,175,604 B2
(45) Date of Patent: May 8, 2012

(54) EFFICIENT RISE OVER THERMAL (ROT) CONTROL DURING SOFT HANDOVER

(75) Inventors: Joachim Lohr, Langen (DE); Eiko Seidel, Langen (DE); Dragan Petrovic, Langen (DE)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 10/588,073

(22) PCT Filed: Aug. 31, 2005

(86) PCT No.: PCT/EP2005/009386
§ 371 (c)(1), (2), (4) Date: Jul. 30, 2007

(87) PCT Pub. No.: WO2006/024519
PCT Pub. Date: Mar. 9, 2006

(65) Prior Publication Data
US 2007/0281695 A1    Dec. 6, 2007

(30) Foreign Application Priority Data

Aug. 31, 2004    (EP) ..................................... 04020647

(51) Int. Cl.
  *H04W 36/00*    (2009.01)
  *H04W 4/00*    (2009.01)
  *H04B 1/26*    (2006.01)
  *H04B 7/212*    (2006.01)
(52) U.S. Cl. ........ 455/442; 455/436; 455/331; 370/329; 370/332; 370/443; 370/338
(58) Field of Classification Search .................. 455/442, 455/436, 331; 370/329, 332, 443, 338
See application file for complete search history.

(56) References Cited

U.S. PATENT DOCUMENTS

| | | | |
|---|---|---|---|
| 5,914,950 | A | 6/1999 | Tiedemann, Jr. et al. |
| 5,923,650 | A | 7/1999 | Chen et al. |

(Continued)

FOREIGN PATENT DOCUMENTS

EP    0935401    8/1999

(Continued)

OTHER PUBLICATIONS

Japanese Office Action dated May 22, 2007 with English translation.

(Continued)

*Primary Examiner* — Ariel Balaoing
(74) *Attorney, Agent, or Firm* — Dickinson Wright PLLC

(57) ABSTRACT

The invention relates to a method for communicating information relating to the scheduling of uplink data transmissions for a mobile terminal transmitting data on the uplink to a plurality of base stations during soft handover of the mobile terminal in a mobile communication system. Further at least one base station of said plurality of base stations schedules uplink data transmissions of the mobile terminal in soft handover. The different embodiments of the invention provide a communication system, a radio resource controller, a base station and mobile terminal which may perform different tasks of the method disclosed. To provide a method reducing the impact of uplink transmissions during soft handover on the rise over thermal it is suggested to provide all base stations communicating with the mobile terminal during soft handover with information on the maximum amount of resources allocated to the mobile terminal for uplink transmissions thereby allowing the base stations to schedule other terminal taking into account this information.

28 Claims, 13 Drawing Sheets

U.S. PATENT DOCUMENTS

| | | | |
|---|---|---|---|
| 6,414,947 B1 * | 7/2002 | Legg et al. | 370/331 |
| 2003/0133415 A1 | 7/2003 | Kim et al. | |
| 2003/0185159 A1 * | 10/2003 | Seo et al. | 370/278 |
| 2004/0109424 A1 | 6/2004 | Chheda | |
| 2004/0160925 A1 * | 8/2004 | Heo et al. | 370/335 |
| 2004/0219919 A1 | 11/2004 | Whinnett et al. | |
| 2004/0219920 A1 * | 11/2004 | Love et al. | 455/442 |
| 2005/0037771 A1 * | 2/2005 | Tiedemann et al. | 455/453 |
| 2005/0048975 A1 * | 3/2005 | Ranta-Aho et al. | 455/438 |
| 2005/0094600 A1 * | 5/2005 | Zhang et al. | 370/331 |
| 2005/0201337 A1 | 9/2005 | Heo et al. | |
| 2006/0034216 A1 | 2/2006 | Kim et al. | |

FOREIGN PATENT DOCUMENTS

| | | |
|---|---|---|
| JP | 2001519123 | 10/2001 |

OTHER PUBLICATIONS

International Search Report dated Nov. 23, 2005.

D. Chase, "Code Combining—A Maximum-Likelihood Decoding Approach for Combining an Arbitrary Number of Noisy Packets," IEEE Transactions on Communications, vol.33, No. 5, May 1985, pp. 385-393.

3GPP TS25.401 v6.1.0, Technical Specification, $3^{rd}$ Generation Partnership Project, Technical Specification Group Radio Access Network, UTRAN Overall Description (Release 6), www.3GPP.com, Jun. 2003, pp. 1-44.

3GPP TR25.897 v0.2.0, Technical Report, $3^{rd}$ Generation Partnership Project, Technical Specification Group Radio Access Network, Feasibility Study on the Evolution of UTRAN Architecture (Release 6), www.3GPP.com, Feb. 2003, pp. 1-7.

3GPP TR25.896 v.6.0.0, Technical Specification, $3^{rd}$ Generation Partnership Project, Technical Specification Group Radio Access Network, Feasibility Study for Enhanced Uplink for UTRA FDD (Release 6), www.3GPP.com, Mar. 2004, pp. 1-179.

"Scheduled and Autonomous Mode Operation for the Enhanced Uplink," 3GPP TSG RAN WG1#31, Tdoc R1-03-0284, Tokyo, Japan, Feb. 17-20, 2003, pp. 1-7.

"HARQ Structure," 3GPP TSG-RAN WG1#31, Tdoc R1-030247, Tokyo, Japan, Feb. 18-21, 2003, 99. 1-3.

3GPP TS 25.321 v6.1.0, Technical Specification, $3^{rd}$ Generation Partnership Project, Technical Specification Group Radio Access Network, Medium Access Control (MAC) Protocol Specification (Release 6), www.3GPP.com, Mar. 2004, pp. 1-61.

* cited by examiner

RELATED ART

EFFICIENT RISE OVER THERMAL (ROT) CONTROL DURING SOFT HANDOVER

FIELD OF THE INVENTION

The invention relates to a method for communicating information relating to the scheduling of uplink data transmissions for a mobile terminal transmitting data on the uplink to a plurality of base stations during soft handover of the mobile terminal in a mobile communication system. Further at least one base station of said plurality of base stations schedules uplink data transmissions of the mobile terminal in soft handover. Moreover, the different embodiments of the invention provide a communication system, a radio resource controller, a base station and a mobile terminal, which may perform different tasks of the method disclosed.

TECHNICAL BACKGROUND

W-CDMA (Wideband Code Division Multiple Access) is a radio interface for IMT-2000 (International Mobile Communication), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4 and Release 5 and discussion on further improvements is ongoing under the scope of Release 6.

The dedicated channel (DCH) for downlink and uplink and the downlink shared channel (DSCH) have been defined in Release 99 and Release 4. In the following years, the developers recognized that for providing multimedia services—or data services in general—high speed asymmetric access had to be implemented. In Release 5 the high-speed downlink packet access (HSDPA) was introduced. The new high-speed downlink shared channel (HS-DSCH) provides downlink high-speed access to the user from the UMTS Radio Access Network (RAN) to the communication terminals, called user equipments in the UMTS specifications.

Hybrid ARQ Schemes

The most common technique for error detection of non-real time services is based on Automatic Repeat reQuest (ARQ) schemes, which are combined with Forward Error Correction (FEC), called Hybrid ARQ. If Cyclic Redundancy Check (CRC) detects an error, the receiver requests the transmitter to send additional bits or a new data packet. From different existing schemes the stop-and-wait (SAW) and selective-repeat (SR) continuous ARQ are most often used in mobile communication.

A data unit will be encoded before transmission. Depending on the bits that are retransmitted three different types of ARQ may be defined.

In HARQ Type I the erroneous data packets received, also called PDUs (Packet Data Unit) are discarded and new copy of that PDU is retransmitted and decoded separately. There is no combining of earlier and later versions of that PDU. Using HARQ Type II the erroneous PDU that needs to be retransmitted is not discarded, but is combined with some incremental redundancy bits provided by the transmitter for subsequent decoding. Retransmitted PDU sometimes have higher coding rates and are combined at the receiver with the stored values. That means that only little redundancy is added in each retransmission.

Finally, HARQ Type III is almost the same packet retransmission scheme as Type II and only differs in that every retransmitted PDU is self-decodable. This implies that the PDU is decodable without the combination with previous PDUs. In case some PDUs are heavily damaged such that almost no information is reusable self decodable packets can be advantageously used.

When employing chase-combining the retransmission packets carry identical symbols. In this case the multiple received packets are combined either by a symbol-by-symbol or by a bit-by-bit basis (see D. Chase: "Code combining: A maximum-likelihood decoding approach for combining an arbitrary number of noisy packets", IEEE Transactions on Communications, Col. COM-33, pages 385 to 393, May 1985). These combined values are stored in the soft buffers of respective HARQ processes.

Packer Scheduling

Packet scheduling may be a radio resource management algorithm used for allocating transmission opportunities and transmission formats to the users admitted to a shared medium. Scheduling may be used in packet based mobile radio networks in combination with adaptive modulation and coding to maximize throughput/capacity by e.g. allocating transmission opportunities to the users in favorable channel conditions. The packet data service in UMTS may be applicable for the interactive and background traffic classes, though it may also be used for streaming services. Traffic belonging to the interactive and background classes is treated as non real time (NRT) traffic and is controlled by the packet scheduler. The packet scheduling methodologies can be characterized by:

- Scheduling period/frequency: The period over which users are scheduled ahead in time.
- Serve order: The order in which users are served, e.g. random order (round robin) or according to channel quality (C/I or throughput based).
- Allocation method: The criterion for allocating resources, e.g. same data amount or same power/code/time resources for all queued users per allocation interval.

The packet scheduler for uplink is distributed between Radio Network Controller (RNC) and user equipment in 3GPP UMTS R99/R4/R5. On the uplink, the air interface resource to be shared by different users is the total received power at a Node B, and consequently the task of the scheduler is to allocate the power among the user equipment(s). In current UMTS R99/R4/R5 specifications the RNC controls the maximum rate/power a user equipment is allowed to transmit during uplink transmission by allocating a set of different transport formats (modulation scheme, code rate, etc.) to each user equipment.

The establishment and reconfiguration of such a TFCS (transport format combination set) may be accomplished using Radio Resource Control (RRC) messaging between RNC and user equipment. The user equipment is allowed to autonomously choose among the allocated transport format combinations based on its own status e.g. available power and buffer status. In current UMTS R99/R4/R5 specifications there is no control on time imposed on the uplink user equipment transmissions. The scheduler may e.g. operate on transmission time interval basis.

UMTS Architecture

The high level R99/4/5 architecture of Universal Mobile Telecommunication System (UMTS) is shown in FIG. 1 (see 3GPP TR 25.401: "UTRAN Overall Description", available from http://www.3gpp.org). The network elements are functionally grouped into the Core Network (CN) 101, the UMTS Terrestrial Radio Access Network (UTRAN) 102 and the User Equipment (UE) 103. The UTRAN 102 is responsible for handling all radio-related functionality, while the CN 101 is responsible for routing calls and data connections to external networks. The interconnections of these network elements are defined by open interfaces (Iu, Uu). It should be noted that UMTS system is modular and it is therefore possible to have several network elements of the same type.

FIG. 2 illustrates the current architecture of UTRAN. A number of Radio Network Controllers (RNCs) 201, 202 are connected to the CN 101. Each RNC 201, 202 controls one or several base stations (Node Bs) 203, 204, 205, 206, which in turn communicate with the user equipments. An RNC controlling several base stations is called Controlling RNC (C-RNC) for these base stations. A set of controlled base stations accompanied by their C-RNC is referred to as Radio Network Subsystem (RNS) 207, 208. For each connection between User Equipment and the UTRAN, one RNS is the Serving RNS (S-RNS). It maintains the so-called Iu connection with the Core Network (CN) 101. When required, the Drift RNS 302 (D-RNS) 302 supports the Serving RNS (S-RNS) 301 by providing radio resources as shown in FIG. 3. Respective RNCs are called Serving RNC (S-RNC) and Drift RNC (D-RNC). It is also possible and often the case that C-RNC and D-RNC are identical and therefore abbreviations S-RNC or RNC are used.

Evolved UMTS UTRAN Architecture

In the following a proposal for an Evolved UMTS UTRAN architecture will be described (see also 3GPP TR 25.897: "Feasibility Study on the Evolution of UTRAN Architecture", V.0.2.0, available at http://www.3gpp.org). In this architecture each of the new network elements may be defined in terms of its control and user plane functions. An overview of the network architecture is given in the FIG. 9.

The RNG (Radio Network Gateway) is used for interworking with the conventional RAN, and to act as a mobility anchor point meaning that once an RNG has been selected for the connection, it is retained for the duration of the call. This includes functions both in control plane and user plane. Further, the RNG provides connectivity to the core network of the mobile communication system.

Control Plane Functions

Part of RNG functions is to act as a signaling gateway between the evolved RAN and the CN, and the evolved RAN and Rel99/4/5 UTRAN. It has the following main functions:

Iu signaling gateway, i.e. anchor point for the RANAP connection,
  RANAP (Radio Access Network Application Part) connection termination, including:
    Setup and release of the signaling connections
    Discrimination of connectionless messages
    Processing of RANAP connectionless messages,
    Relay of idle and connected mode paging message to the relevant NodeB+(s),
The RNG takes the CN role in inter NodeB+ relocations,
User plane control and
Iur signaling gateway between NodeB+ and Rel99/4/5 RNC User Plane Functions The RNG is the user plane access point from the CN or conventional RAN to the evolved RAN. It has the following user plane functions:
  User plane traffic switching during relocation,
  Relaying GTP (GPRS tunneling protocol on the Iu interface) packets between NodeB+ and SGSN (Serving GPRS Support Node, an element of the CN) and
  Iur interworking for user plane The NodeB+ element terminates all the RAN radio protocols (L1, L2 and L3). NodeB+ functions are studied separately for control plane and user plane.

Control Plane Functions

This category includes all the functions related to the control of the connected mode terminals within the evolved RAN. Main functions are:
  Control of the UE,
  RANAP connection termination,
    Processing of RANAP connection oriented protocol messages
  Control/termination of the RRC connection and
  Control of the initialization of the relevant user plane connections The UE context is removed from the (serving) NodeB+ when the RRC connection is terminated, or when the functionality is relocated to another NodeB+ (serving NodeB+ relocation). Control plane functions include also all the functions for the control and configuration of the resources of the cells of the NodeB+, and the allocation of the dedicated resources upon request from the control plane part of the serving NodeB+.

User Plane Functions

User plane functions include the following:
  Protocol functions of PDCP (Packet Data Convergence Protocol), RLC and MAC and
  Macro Diversity Combining Enhanced Uplink Dedicated Channel (E-DCH)

Uplink enhancements for Dedicated Transport Channels (DTCH) are currently studied by the 3GPP Technical Specification Group RAN (see 3GPP TR 25.896: "Feasibility Study for Enhanced Uplink for UTRA FDD (Release 6)", available at http://www.3gpp.org). Since the use of IP-based services become more important, there is an increasing demand to improve the coverage and throughput of the RAN as well as to reduce the delay of the uplink dedicated transport channels. Streaming, interactive and background services could benefit from this enhanced uplink.

One enhancement is the usage of adaptive modulation and coding schemes (AMC) in connection with Node B controlled scheduling, thus enhancements of the Uu interface. In the existing R99/R4/R5 system the uplink maximum data rate control resides in the RNC. By relocating the scheduler in the Node B the latency introduced due to signaling on the interface between RNC and Node B may be reduced and thus the scheduler may be able to respond faster to temporal changes in the uplink load. This may reduce the overall latency in communications of the user equipment with the RAN. Therefore Node B controlled scheduling is capable of better controlling the uplink interference and smoothing the noise rise variance by allocating higher data rates quickly when the uplink load decreases and respectively by restricting the uplink data rates when the uplink load increases. The coverage and cell throughput may be improved by a better control of the uplink interference.

Another technique, which may be considered to reduce the delay on the uplink, is introducing a shorter TTI (Transmission Time Interval) length for the E-DCH compared to other transport channels. A transmission time interval length of 2 ms is currently investigated for use on the E-DCH, while a transmission time interval of 10 ms is commonly used on the other channels. Hybrid ARQ, which was one of the key technologies in HSDPA, is also considered for the enhanced uplink dedicated channel. The Hybrid ARQ protocol between a Node B and a user equipment allows for rapid retransmissions of erroneously received data units, and may thus reduce the number of RLC (Radio Link Control) retransmissions and the associated delays. This may improve the quality of service experienced by the end user.

To support enhancements described above, a new MAC sub-layer is introduced which will be called MAC-e in the following (see 3GPP TSG RAN WG1, meeting #31, Tdoc R01-030284, "Scheduled and Autonomous Mode Operation for the Enhanced Uplink"). The entities of this new sub-layer, which will be described in more detail in the following sections, may be located in user equipment and Node B. On user equipment side, the MAC-e performs the new task of multiplexing upper layer data (e.g. MAC-d) data into the new enhanced transport channels and operating HARQ protocol transmitting entities.

Further, the MAC-e sub-layer may be terminated in the S-RNC during handover at the UTRAN side. Thus, the reordering buffer for the reordering functionality provided may also reside in the S-RNC.

E-DCH MAC Architecture at the User Equipment

FIG. 4 shows the exemplary overall E-DCH MAC architecture on user equipment side. A new MAC functional entity, the MAC-e 403, is added to the MAC architecture of Rel/99/4/5. The MAC-e 405 entity is depicted in more detail in FIG. 5.

There are M different data flows (MAC-d) carrying data packets to be transmitted from user equipment to Node B. These data flows can have different QoS (Quality of Service), e.g. delay and error requirements, and may require different configurations of HARQ instances. Therefore the data packets can be stored in different Priority Queues. The set of HARQ transmitting and receiving entities, located in user equipment and Node B respectively will be referred to as HARQ process. The scheduler will consider QoS parameters in allocating HARQ processes to different priority queues. MAC-e entity receives scheduling information from Node B (network side) via Layer 1 signaling.

E-DCH MAC Architecture at the UTRAN

In soft handover operation the MAC-e entities in the E-DCH MAC Architecture at the UTRAN side may be distributed across Node B (MAC-eb) and S-RNC (MAC-es). The scheduler in Node B chooses the active users and performs rate control by determining and signaling a commanded rate, suggested rate or TFC (Transport Format Combination) threshold that limits the active user (UE) to a subset of the TCFS (Transport Format Combination Set) allowed for transmission.

Every MAC-e entity corresponds to a user (UE). In FIG. 6 the Node B MAC-e architecture is depicted in more detail. It can be noted that each HARQ Receiver entity is assigned certain amount or area of the soft buffer memory for combining the bits of the packets from outstanding retransmissions. Once a packet is received successfully, it is forwarded to the reordering buffer providing the in-sequence delivery to upper layer. According to the depicted implementation, the reordering buffer resides in S-RNC during soft handover (see 3GPP TSG RAN WG 1, meeting #31: "HARQ Structure", Tdoc R1-030247, available of http://www.3gpp.org). In FIG. 7 the S-RNC MAC-e architecture which comprises the reordering buffer of the corresponding user (UE) is shown. The number of reordering buffers is equal to the number of data flows in the corresponding MAC-e entity on user equipment side. Data and control information is sent from all Node Bs within Active Set to S-RNC during soft handover.

It should be noted that the required soft buffer size depends on the used HARQ scheme, e.g. an HARQ scheme using incremental redundancy (IR) requires more soft buffer than one with chase combining (CC).

E-DCH Signaling

E-DCH associated control signaling required for the operation of a particular scheme consists of uplink and downlink signaling. The signaling depends on uplink enhancements being considered.

In order to enable Node B controlled scheduling (e.g. Node B controlled time and rate scheduling), user equipment has to send some request message on the uplink for transmitting data to the Node B. The request message may contain status information of a user equipment e.g. buffer status, power status, channel quality estimate. The request message is in the following referred to as Scheduling Information (SI). Based on this information a Node B can estimate the noise rise and schedule the UE. With a grant message sent in the downlink from the Node B to the UE, the Node B assigns the UE the TFCS with maximum data rate and the time interval, the UE is allowed to send. The grant message is in the following referred to as Scheduling Assignment (SA).

In the uplink user equipment has to signal Node B with a rate indicator message information that is necessary to decode the transmitted packets correctly, e.g. transport block size (TBS), modulation and coding scheme (MCS) level, etc. Furthermore, in case HARQ is used, the user equipment has to signal HARQ related control information (e.g. Hybrid ARQ process number, HARQ sequence number referred to as New Data Indicator (NDI) for UMTS Rel. 5, Redundancy version (RV), Rate matching parameters etc.)

After reception and decoding of transmitted packets on enhanced uplink dedicated channel (E-DCH) the Node B has to inform the user equipment if transmission was successful by respectively sending ACK/NAK in the downlink.

Mobility Management within Rel99/4/5 UTRAN

Before explaining some procedures connected to mobility management, some terms frequently used in the following are defined first.

A radio link may be defined as a logical association between single UE and a single UTRAN access point. Its physical realization comprises radio bearer transmissions.

A handover may be understood as a transfer of a UE connection from one radio bearer to another (hard handover) with a temporary break in connection or inclusion/exclusion of a radio bearer to/from UE connection so that UE is constantly connected UTRAN (soft handover). Soft handover is specific for networks employing Code Division Multiple Access (CDMA) technology. Handover execution may controlled by S-RNC in the mobile radio network when taking the present UTRAN architecture as an example.

The active set associated to a UE comprises a set of radio links simultaneously involved in a specific communication service between UE and radio network. An active set update procedure may be employed to modify the active set of the communication between UE and UTRAN. The procedure may comprise three functions: radio link addition, radio link removal and combined radio link addition and removal. It should be noted that based on active set the set of NodeBs the UE is currently communicating with is identified.

The maximum number of simultaneous radio links is set to eight. New radio links are added to the active set once the pilot signal strengths of respective base stations exceed certain threshold relative to the pilot signal of the strongest member within active set.

A radio link is removed from the active set once the pilot signal strength of the respective base station exceeds certain threshold relative to the strongest member of the active set. Threshold for radio link addition is typically chosen to be higher than that for the radio link deletion. Hence, addition and removal events form a hysteresis with respect to pilot signal strengths.

Pilot signal measurements may be reported to the network (e.g to S-RNC) from UE by means of RRC signaling. Before sending measurement results, some filtering is usually performed to average out the fast fading. Typical filtering duration may be about 200 ms contributing to handover delay. Based on measurement results, the network (e.g. S-RNC) may decide to trigger the execution of one of the functions of active set update procedure (addition/removal of a Node B to/from current Active Set).

E-DCH—Node B Controlled Scheduling

Node B controlled scheduling is one of the technical features for E-DCH which is foreseen to enable more efficient use of the uplink power resource in order to provide a higher cell throughput in the uplink and to increase the coverage. The term "Node B controlled scheduling" denotes the possibility for the Node B to control, within the limits set by the RNC, the set of TFCs from which the UE may choose a suitable TFC. The set of TFCs from which the UE may choose autonomously a TFC is in the following referred to as "Node B controlled TFC subset".

The "Node B controlled TFC subset" is a subset of the TFCS configured by RNC as seen in FIG. 8. The UE selects a suitable TFC from the "Node B controlled TFC subset" employing the Rel5 TFC selection algorithm. Any TFC in the "Node B controlled TFC subset" might be selected by the UE, provided there is sufficient power margin, sufficient data available and TFC is not in the blocked state. Two fundamental approaches to scheduling UE transmission for the E-DCH exist. The scheduling schemes can all be viewed as management of the TFC selection in the UE and mainly differs in how the Node B can influence this process and the associated signaling requirements.

Node B Controlled Rate Scheduling

The principle of this scheduling approach is to allow Node B to control and restrict the transport format combination selection of the user equipment by fast TFCS restriction control. A Node B may expand/reduce the "Node B controlled subset", which user equipment can choose autonomously on suitable transport format combination from, by Layer-1 signaling. In Node B controlled rate scheduling all uplink transmissions may occur in parallel but at a rate low enough such that the noise rise threshold at the Node B is not exceeded. Hence, transmissions from different user equipments may overlap in time. With Rate scheduling a Node B can only restrict the uplink TFCS but does not have any control of the time when UEs are transmitting data on the E-DCH. Due to Node B being unaware of the number of UEs transmitting at the same time no precise control of the uplink noise rise in the cell may be possible (see 3GPP TR 25.896: "Feasibility study for Enhanced Uplink for UTRA FDD (Release 6)", version 1.0.0, available at http://www.3gpp.org).

Two new Layer-1 messages are introduced in order to enable the transport format combination control by Layer-1 signaling between the Node B and the user equipment. A Rate Request (RR) may be sent in the uplink by the user equipment to the Node B. With the RR the user equipment can request the Node B to expand/reduce the "Node controlled TFC Subset" by one step. Further, a Rate Grant (RG) may be sent in the downlink by the Node B to the user equipment. Using the RG, the Node B may change the "Node B controlled TFC Subset", e.g. by sending up/down commands. The new "Node B controlled TFC Subset" is valid until the next time it is updated.

Node B Controlled Rate and Time Scheduling

The basic principle of Node B controlled time and rate scheduling is to allow (theoretically only) a subset of the user equipments to transmit at a given time, such that the desired total noise rise at the Node B is not exceeded. Instead of sending up/down commands to expand/reduce the "Node B controlled TFC Subset" by one step, a Node B may update the transport format combination subset to any allowed value through explicit signaling, e.g. by sending a TFCS indicator (which could be a pointer).

Furthermore, a Node B may set the start time and the validity period a user equipment is allowed to transmit. Updates of the "Node B controlled TFC Subsets" for different user equipments may be coordinated by the scheduler in order to avoid transmissions from multiple user equipments overlapping in time to the extent possible. In the uplink of CDMA systems, simultaneous transmissions always interfere with each other. Therefore by controlling the number of user equipments, transmitting simultaneously data on the E-DCH, Node B may have more precise control of the uplink interference level in the cell. The Node B scheduler may decide which user equipments are allowed to transmit and the corresponding TFCS indicator on a per transmission time interval (TTI) basis based on, for example, buffer status of the user equipment, power status of the user equipment and available interference Rise over Thermal (RoT) margin at the Node B.

Two new Layer-1 messages are introduced in order to support Node B controlled time and rate scheduling. A Scheduling Information Update (SI) may be sent in the uplink by the user equipment to the Node B. If user equipment finds a need for sending scheduling request to Node B (for example new data occurs in user equipment buffer), a user equipment may transmit required scheduling information. With this scheduling information the user equipment provides Node B information on its status, for example its buffer occupancy and available transmit power.

A Scheduling assignment (SA) may be transmitted in the downlink from a Node B to a user equipment. Upon receiving the scheduling request the Node B may schedule a user equipment based on the scheduling information (SI) and parameters like available RoT margin at the Node B. In the Scheduling Assignment (SA) the Node B may signal the TFCS indicator and subsequent transmission start time and validity period to be used by the user equipment.

Node B controlled time and rate scheduling provides a more precise RoT control compared to the rate-only controlled scheduling as already mentioned before. However this more precise control of the interference at this Node B is obtained at the cost of more signaling overhead and scheduling delay (scheduling request and scheduling assignment messages) compared to rate control scheduling.

In FIG. 10 a general scheduling procedure with Node B controlled time and rate scheduling is shown. When a user equipment wants to be scheduled for transmission of data on E-DCH it first sends a scheduling request to Node B. $T_{prop}$ denotes here the propagation time on the air interface. The contents of this scheduling request are information (scheduling information) for example buffer status and power status of the user equipment. Upon receiving that scheduling request, the Node B may process the obtained information and determine the scheduling assignment. The scheduling will require the processing time $T_{schedule}$.

The scheduling assignment, which comprises the TFCS indicator and the corresponding transmission start time and validity period, may be then transmitted in the downlink to the user equipment. After receiving the scheduling assignment the user equipment will start transmission on E-DCH in the assigned transmission time interval.

The use of either rate scheduling or time and rate scheduling may be restricted by the available power as the E-DCH will have to co-exist with a mix of other transmissions by the user equipments in the uplink. The co-existence of the different scheduling modes may provide flexibility in serving different traffic types. For example, traffic with small amount of data and/or higher priority such as TCP ACK/NACK may be sent using only a rate control mode with autonomous transmissions compared to using time and rate-control scheduling. The former would involve lower latency and lower signaling overhead.

Transport Channels and TFC Selection

In third generation mobile communication systems data generated at higher layers is carried over the air with transport channels, which are mapped to different physical channels in the physical layer. Transport channels are the services, which are offered by the physical layer to Medium Access Control (MAC) layer for information transfer. The transport channels are primarily divided into two types:

Common transport channels, where there is a need for explicit identification of the receiving UE, if the data on the transport channel is intended for a specific UE or a sub-set of all UEs (no UE identification is needed for broadcast transport channels)

Dedicated transport channels, where the receiving UE is implicitly given by the physical channel, that carries the transport channel One example for a dedicated transport channel is the E-DCH. The data is transmitted within the transport channels during periodic intervals, commonly referred to as transmission time interval (TTI). A transport block is the basic data unit exchanged over transport channels, i.e. between the physical layer and MAC layer. Transport blocks arrive to or are delivered by the physical layer once every TTI. The transport format (TF) describes how data is transmitted during a TTI on a transport channel.

The transport format consists of two parts. The semi-static part indicating the Transmission Time Interval (TTI) (e.g. 10 ms, 20 ms, 40 ms, 80 ms), the Type of FEC (Forward Error Correction) coding (e.g. convolutional, turbo, none), the Channel Coding-rate (e.g. ½, ⅓) and the CRC size. The second part, the dynamic part indicates the Number of transport blocks per TTI, and Number of bits per transport blocks.

The attributes of the dynamic part may vary for every TTI, whereas the attributes of the semi-static part are changed by RRC transport channel reconfiguration procedure. For each transport channel a set of transport formats are defined, the so-called Transport Format Set (TFS). The TFS is assigned to MAC layer from RRC at transport channel set up. An uplink or downlink connection typically consists of more than one transport channel. The combination of transport formats of all transport channels is known as the Transport Format Combination (TFC). At the start of each TTI, an appropriate TFC for all the transport channels is selected. Dependent on the number of transport channels, the TFC comprises a number of TFs, which define the transport format to be used for transmitting data of the respective transport channel within a TTI.

The MAC layer selects the transport format for each transport channel on the basis of a set of transport format combinations (or TFCS for transport format combination set) assigned by RRC radio resource control unit and also selects the quantity of data of each logical channel to be transmitted on the associated transport channel during the corresponding TTI. This procedure is referred to as "TFC (Transport Format Combination) selection". For details on the UMTS TFC selection procedure see 3GPP TS 25.321, "Medium Access Control (MAC) protocol specification; (Release 6)", version 6.1.0, available at http://www.3gpp.org.

TFC selection at the UE may be carried out at the start of each reference TTI, which denotes the smallest TTI of the involved transport channels. If for example TFC selection is performed among three transport channels with a TTI length of transport channel #1 equals 10 ms and a TTI length of equal to 40 ms for transport channels #2 an #3, TFC selection is performed every 10 ms.

Soft Handover (SHO) for E-DCH

It is currently considered, that soft handover is supported for data transmissions on the E-DCH, as for dedicated channels in Rel99/4/5. There are several options on how the UE uplink transmission is controlled in soft handover. There could be just one scheduling entity (scheduling Node B), which controls the uplink transmissions of the UE (maximum data rate/power ratio) or there could be multiple scheduling entities, for example all the node Bs in the active set.

E-DCH transmissions of UEs in soft handover may have an impact on the RoT variation of the multiple cells in the active set. If there is for example one Node B identified as a sole scheduling entity, scheduling of a UE in SHO without consideration of non-scheduling cells in the active set could lead to an unexpected variation of the RoT in those cells. This interference, which is also referred to as other cell interference, may have an impact on the average cell throughput in those cells.

Equation 1 shows that for a designated noise rise target in the system an increase of the i-factor—defined as the ratio of other cell interference to own cell interference—will reduce the average cell throughput. The equation can be easily derived from basic formulas presented by Holma et al., "WCDMA for UMTS", Wiley & Sons, <year>, <chapter/pages>, 2002, Chapter 8, Page 174:

$$\bar{C} = \frac{\eta_{UL} \cdot W}{(1+i) \cdot (E_b/N_0)} \qquad \text{Equation 1}$$

with $$i = \frac{\text{other cell } \mathit{interf.}}{\text{own cell } \mathit{interf.}}$$

One way to reduce the i-factor and therefore to increase the average cell throughput is to avoid high data rate transmissions for UEs in soft handover. Only small data rates are allocated to those UEs from the scheduling Node B. But this strategy would on the other hand reduce the coverage, which is in contradiction to one of the goals of the enhanced uplink. Therefore some other method, which provides an efficient uplink noise rise management for UEs in SHO, is required.

In case of multiple scheduling Node Bs there might be some further problems. FIG. 11 shows an exemplary soft handover scenario, where both Node Bs in the active set control uplink transmissions of the UE, by restricting the maximum allowed data rate for E-DCH transmissions. Every Node B reserves resources for this UE according to the signaled maximum allowed transmission data rate.

In the example Node B2 allocates resources to the UE for a maximum data rate of 256 kps, whereas Node B1 assigns only resources up 64 kps to the UE.

The UE would for example adopt the lowest rate restriction, 64 kbps, in order to avoid causing unexpected uplink interference to Node B1. However since Node B2 is not aware of the signaled maximum allowed data rate by Node B1, it has allocated resources to the UE that will not be used. This unused resource could have been allocated to other UEs under the control of Node B2.

SUMMARY OF THE INVENTION

The object of the invention is to provide a method controlling the impact of uplink transmissions during soft handover on the rise over thermal.

The object is solved by the subject matter of the independent claims. Advantageous embodiments of the invention are subject matters to the dependent claims.

One main aspect of the unveiled invention is to provide an efficient RoT control by providing coordination between the active set's Node Bs by means of signaling the maximum amount of uplink resources allocated to a UE in soft handover among the active set Node Bs. Depending on the underlying radio access network architecture, the signaling may convey the data via a network entity controlling the radio resources of the UE in soft handover.

Another alternative solution according to another aspect of the invention may make use of signaling the maximum amount of resources used by the UE for uplink transmissions during soft handover from the UE to the active set's Node Bs in order to overcome the before-mentioned problems.

According to one embodiment of the invention a method for communicating information relating to the scheduling of uplink data transmissions is provided. A mobile terminal may transmit data on the uplink to a plurality of base stations during soft handover of the mobile terminal in a mobile communication system. At least one base station of said plurality of base stations schedules uplink data transmissions of the mobile terminal in soft handover.

The at least one scheduling base station of said plurality of base stations may determine scheduling information indicative of a maximum amount of uplink resources allocatable to the mobile terminal. The allocated maximum amount of uplink resources may be indicated to at least one other base station of said plurality of base stations. The at least one other base station may schedule at least one other mobile terminal in communication with a respective base station taking into account the indicated maximum amount of uplink resources allocated to said mobile terminal in soft handover.

In another embodiment of the invention, the at least one scheduling base station may further signal the determined scheduling information to the mobile terminal in soft handover to allocate the maximum amount of uplink resources to the terminal.

Moreover, in another embodiment, the maximum amount of uplink resources may indicate the maximum data rate or the uplink maximum transmission power that may be used by the mobile terminal for uplink data transmissions.

Possible implementations for signaling the amount of uplink resources allocated to a mobile terminal may be the use of controlling the mobile terminal's maximum TFC or to signal the maximum allocated uplink transmission power. Hence, in a further embodiment of the invention the at least one scheduling base station may schedule uplink data transmissions by controlling the TFCS available to the mobile terminal in soft handover for uplink data transmission or by controlling the uplink transmission power of the mobile terminal.

The indicated allocated maximum amount of uplink resources may for example be transported via a network entity controlling radio resources of the mobile terminal in soft handover. In a variation of the embodiments above, indicating the allocated maximum amount of uplink resources may comprise signaling the allocated maximum amount of uplink resources from the at least one scheduling base station to a network entity controlling radio resources of said mobile terminal in soft handover, and forwarding the allocated maximum amount of uplink resources to the other base stations by the radio resource controlling entity.

In a further embodiment of the invention, the radio resource control entity may determine whether to forward the allocated maximum amount of uplink resources to a respective one of said other base stations based on the cell interference within the radio cell controlled by the respective one of said other base stations. Thereby, the radio resource control entity may reduce the signaling overhead as information on the amount of uplink resources allocated to the mobile terminal is only propagated by the radio resource controlling entity if necessary.

In a further variation of the embodiments above, the indicated allocated maximum amount of uplink resources is transported using control signaling.

In another variation, a scheduling base station may further determine, signal and indicate the maximum amount of resources allocated to the mobile terminal in soft handover each time the mobile terminal in soft handover is scheduled.

Alternatively the maximum amount of resources allocated to the mobile terminal may only be distributed if predetermined conditions are fulfilled. In this respect, the at least one scheduling base station may determine new scheduling information indicative of a new maximum amount of resources allocated to the mobile terminal, and may signal the determined second scheduling information to the mobile terminal in soft handover to allocate the new maximum amount of resources to the terminal. Contrary to the previous variation of the embodiment, the allocated new amount of resources may only be indicated to the said other base stations, if a difference between the new amount of resources and the previous maximum amount of resources is larger than a predetermined threshold value.

In a variation, the at least one scheduling base station may receive information indicating the predetermined threshold value from a network entity controlling the radio resources of the mobile terminal in soft handover.

According to another embodiment of the invention the plurality of base stations defines the active set of the mobile terminal in soft handover and a base station may be added to the active set of the mobile terminal. In this embodiment, the radio resource controlling entity may signal the maximum amount of resources to said added base station. Thus, the new base station added to the active set is aware of the maximum allocated resources for uplink transmissions of the mobile terminal and may consider this information when scheduling other uplink transmissions from other mobile terminals in its cell.

In a variation of this embodiment the information for signaling the maximum amount of resources to said added base station may comprised within a message communicated during the active set update procedure.

In a further embodiment of the invention, a network entity controlling the radio resources of the mobile terminal in soft handover may request from at least one base station of the plurality of base station to signal the maximum amount of resources allocated to the mobile terminal in soft handover to said radio resource controlling entity.

It is understood that the different embodiments of the invention and variations thereof may be applied to scenarios where one base station of said plurality of base stations schedules uplink data transmissions of the mobile terminal in soft handover to all base stations of said plurality of base stations.

Alternatively, in another embodiment of the invention, each of said base stations schedules uplink data transmissions of the mobile terminal in soft handover to the respective one of said plurality of base stations.

In this embodiment, for example, each of the plurality of base stations may further determines scheduling information indicative of a maximum amount of resources allocatable to the mobile terminal by the respective base station, and may further signal the determined scheduling information to the mobile terminal in soft handover to allocate the maximum amount of resources to the terminal for uplink data transmission to the respective base station.

In a further variation, the mobile terminal may choose the lowest assigned maximum amount of resources for uplink data transmissions to all base stations of the plurality of base stations.

Alternatively, the mobile terminal may form a combined maximum amount of uplink resources based on the different assigned maximum amounts of uplink resources, which is used by the mobile terminal for uplink transmissions to all base stations of the plurality of base stations.

Further, each of the plurality of base stations may indicate its allocated maximum amount of uplink resources to a network entity controlling the radio resources of the mobile terminal in soft handover and at least a subset of the plurality of base stations may schedule at least one mobile terminal in communication with the respective base station taking into account a combined value or a lowest value of a maximum amount of resources signaled to the respective base station from the radio resource control entity.

In this exemplary variation of an embodiment of the invention, where multiple base stations communicate with and schedule uplink transmissions of the mobile in soft handover, the radio resource control entity may determine a combined value or a lowest value of a maximum amount of resources based on the maximum amounts of allocated resources indicated by the plurality of base stations and may signal the combined value or the lowest value of a maximum amount of resources from the radio resource control entity to a subset of said plurality of base stations.

The combined value or the lowest value of a maximum amount of resources may for example be signaled to those base stations having indicated a maximum amount of resources different from the determined combined value or the lowest value. However, these parameters may also be signaled to all base stations of the plurality of base stations.

For signaling the maximum amount of resources, which may also be referred to as absolute grant, from a base station to the mobile terminal a shared channel or a dedicated channel may be used according to a further variation of the embodiment.

In another embodiment of the invention a network entity controlling the radio resources of the mobile terminal in soft handover may request from at least one base station of said plurality of base station the maximum amount of uplink resources allocated to the mobile terminal in soft handover. By (individually) querying the base stations, the radio resource controlling entity may limit the signaling load on its interfaces to situations where it seems necessary to obtain scheduling relevant information.

In another embodiment of the invention the transmitted uplink data is carried by an E-DCH.

Another embodiment of the invention relates to a mobile communication system communicating information relating to the scheduling of uplink data transmissions. A mobile terminal transmits data on the uplink to a plurality of base stations during soft handover of the mobile terminal in the mobile communication system. Further, at least one base station of said plurality of base stations schedules uplink data transmissions of the mobile terminal in soft handover. The communication system may the mobile terminal in soft handover, said plurality of base stations and a network entity controlling the radio resources of the mobile terminal in soft handover. At least one scheduling base station of said plurality of base stations is adapted to determine scheduling information indicative of a maximum amount of resources allocatable to the mobile terminal, and the at least one scheduling base station and the radio resource control entity being adapted to indicate the allocated maximum amount of uplink resources to the other base stations of said plurality of base stations.

Moreover, in a further embodiment of the invention, the at least one scheduling base station may be adapted to signal the determined scheduling information to the mobile terminal in soft handover to allocate the maximum amount of uplink resources to the terminal.

Further, the other base stations of said plurality of base stations may be adapted to schedule at least one other mobile terminal in communication with a respective base station taking into account the indicated maximum amount of resources allocated to said mobile terminal in soft handover.

In another embodiment of the invention, the mobile terminal in soft handover, said plurality of base stations and a network entity controlling the radio resources of the mobile terminal in soft handover are adapted to perform the steps of the method according to one of the different embodiments described above and variations thereof.

A further embodiment of the invention provides a base station in a mobile communication system communicating information relating to the scheduling of uplink data transmissions. Again a mobile terminal may transmit data on the uplink to a plurality of base stations including the base station during soft handover of the mobile terminal in a mobile communication system. The base station may inter alia comprise processing means for determining scheduling information indicative of a maximum amount of resources allocatable to the mobile terminal and a transmitter for signaling determined scheduling information to the mobile terminal in soft handover to allocate the maximum amount of resources to the terminal. The transmitter may be adapted to signal the allocated maximum amount of resources to a network entity controlling the radio resources of the mobile terminal in soft handover.

In a variation the base station may further comprise a receiver for receiving a maximum amount of resources allocated to the mobile terminal in soft handover from the radio resource control entity, and a scheduler for scheduling at least one other mobile terminal in communication with the base station taking into account the received maximum amount of resources allocated to said mobile terminal in soft handover.

Moreover the invention provides a radio resource controller in a mobile communication system communicating information relating to the scheduling of uplink data transmissions of a mobile terminal to at least one of a plurality of base stations, wherein the mobile terminal is in soft handover and transmits uplink data to said plurality of base stations. The radio network controller may inter alia comprise a receiver for receiving a maximum amount of resources allocated to the mobile terminal in soft handover from at least one other base station of said plurality of base stations, and a transmitter for signaling the received maximum amount of resources allocated to the mobile terminal in soft handover to at least one other base station of said plurality of base stations.

Further, according to a variation of this embodiment, the radio network controller's receiver is adapted to receive a maximum amount of resources allocated to the mobile terminal in soft handover from at least a subset of said plurality of base stations, and the radio network controller may further comprise processing means to determine a combined value or a lowest value of a maximum amount of resources based on the maximum amounts of allocated resources indicated by the subset of base stations. The transmitter may be further adapted to signal the combined value or the lowest value of a maximum amount of uplink resources to a subset of said plurality of base stations.

In another embodiment of the invention the radio network controller may comprise means adapted to perform the steps of any of methods described in the various embodiments and variations thereof above.

A further embodiment of the invention relates to another alternative solutions to the problem posed above. According to this embodiment, a method for communicating information relating to the scheduling of uplink data transmissions is provided, According to this method a mobile terminal transmits data on the uplink to a plurality of base stations during soft handover of the mobile terminal in a mobile communication system, and at least a subset of said plurality of base stations schedules uplink data transmissions of the mobile terminal in soft handover.

The mobile terminal may receive scheduling information indicative of a maximum amount of resources allocated to the mobile terminal from the subset of base stations, and may choose at the mobile terminal a maximum amount of resources for uplink data transmissions to the plurality of base stations based on the received maximum amounts of resources. Further the mobile terminal may indicate the plurality of base stations the chosen maximum amount of resources for uplink data transmission.

In a variation of this method, the base stations receiving the chosen maximum amount of resources may schedule at least one other mobile terminal in communication with a respective base station taking into account the indicated chosen maximum amount of resources received from said mobile terminal in soft handover.

In a further variation, a subset of base station schedules uplink data transmissions by controlling the TFCS available to the mobile terminal in soft handover and the mobile terminal indicates the chosen maximum amount of resources by means of a TFC pointer indicating the chosen TFC for uplink transmissions.

Moreover, in another variation, the message signaling the TFC pointer to the plurality of base stations may comprise a flag indicating to the plurality of base stations that the maximum data rate specified by the TFC indicator within the message is used for uplink data transmissions during soft handover by the mobile terminal.

Further, another embodiment of the invention relates to a mobile terminal for communicating information relating to the scheduling of uplink data transmissions, wherein the mobile terminal transmits data on the uplink to a plurality of base stations during soft handover of the mobile terminal in a mobile communication system. In this embodiment, at least a subset of said plurality of base stations schedules uplink data transmissions of the mobile terminal in soft handover. The mobile terminal may comprise a receiver for receiving at the mobile terminal scheduling information indicative of a maximum amount of resources allocated to the mobile terminal from the subset of base stations, selection means for choosing at the mobile terminal a maximum amount of resources for uplink data transmissions to the plurality of base stations based on the received maximum amounts of resources, and a transmitter for indicating to the plurality of base stations the chosen maximum amount of resources or the chosen maximum power for uplink data transmission.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
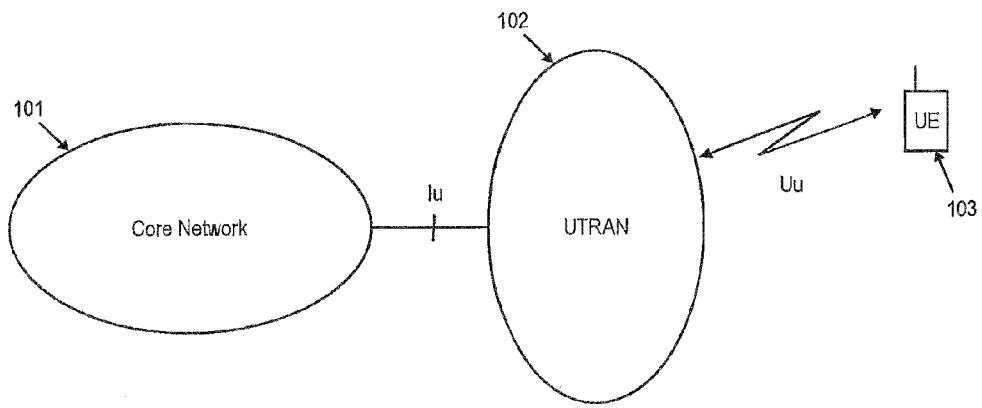
FIG. 1 shows the high-level architecture of UMTS.
Figure 2:
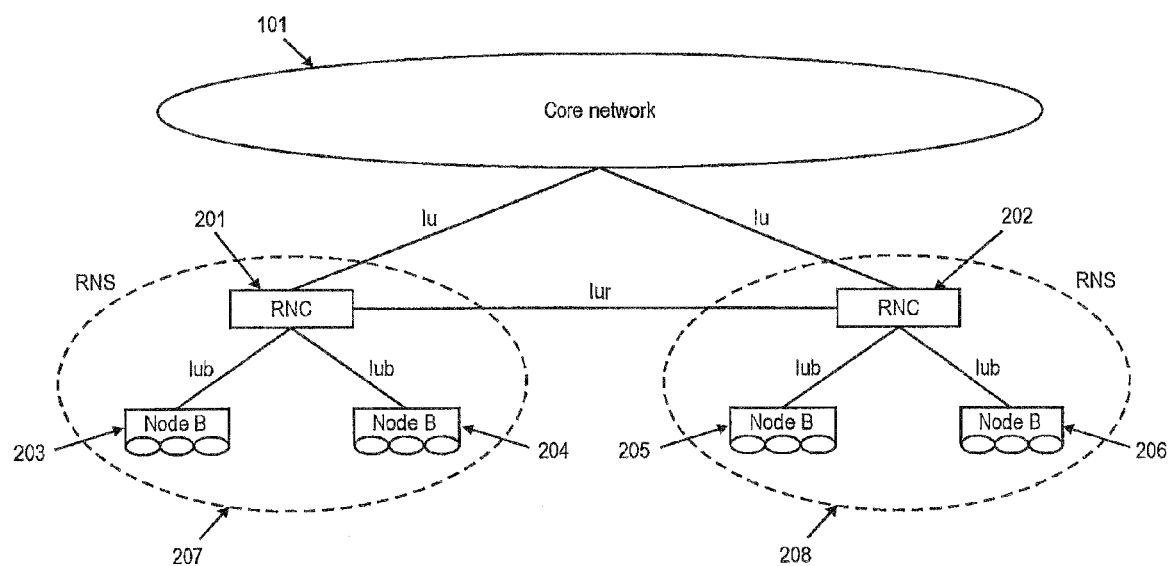
FIG. 2 shows the architecture of the UTRAN according to UMTS R99/4/5.
Figure 3:
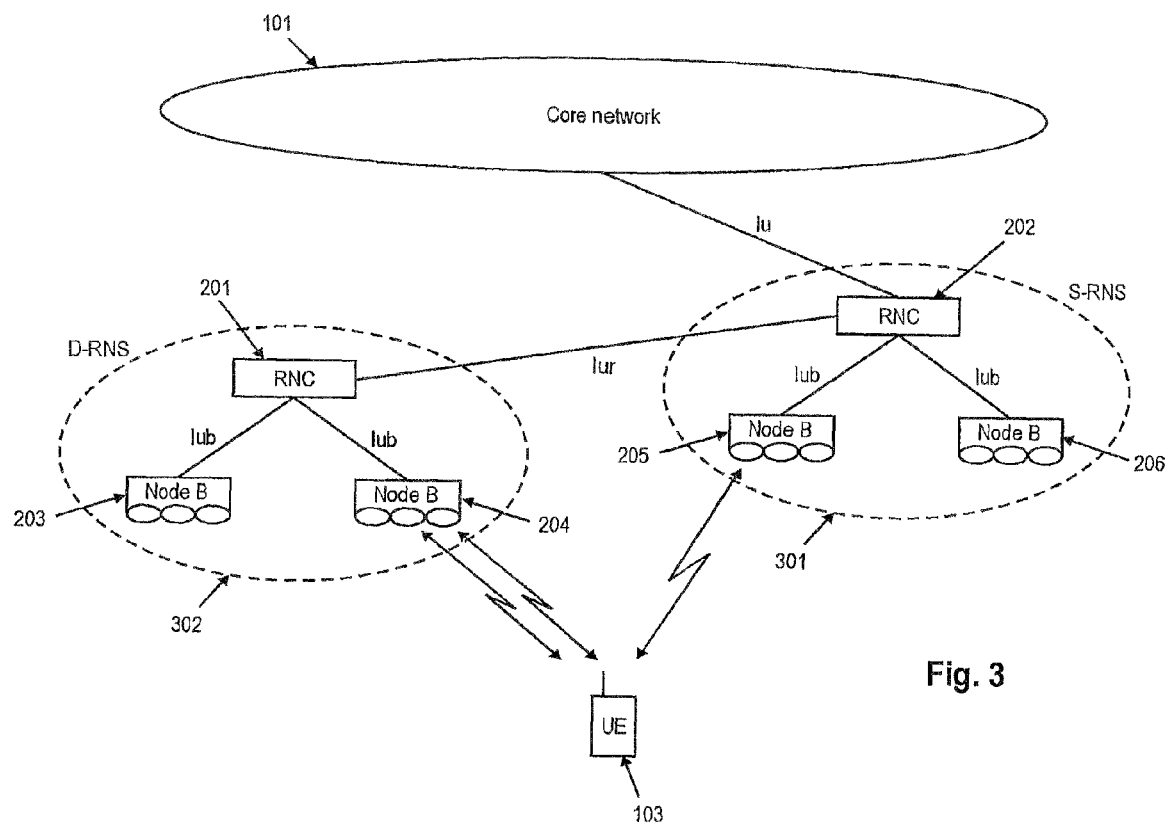
FIG. 3 shows a Drift and a Serving Radio Subsystem.
Figure 4:
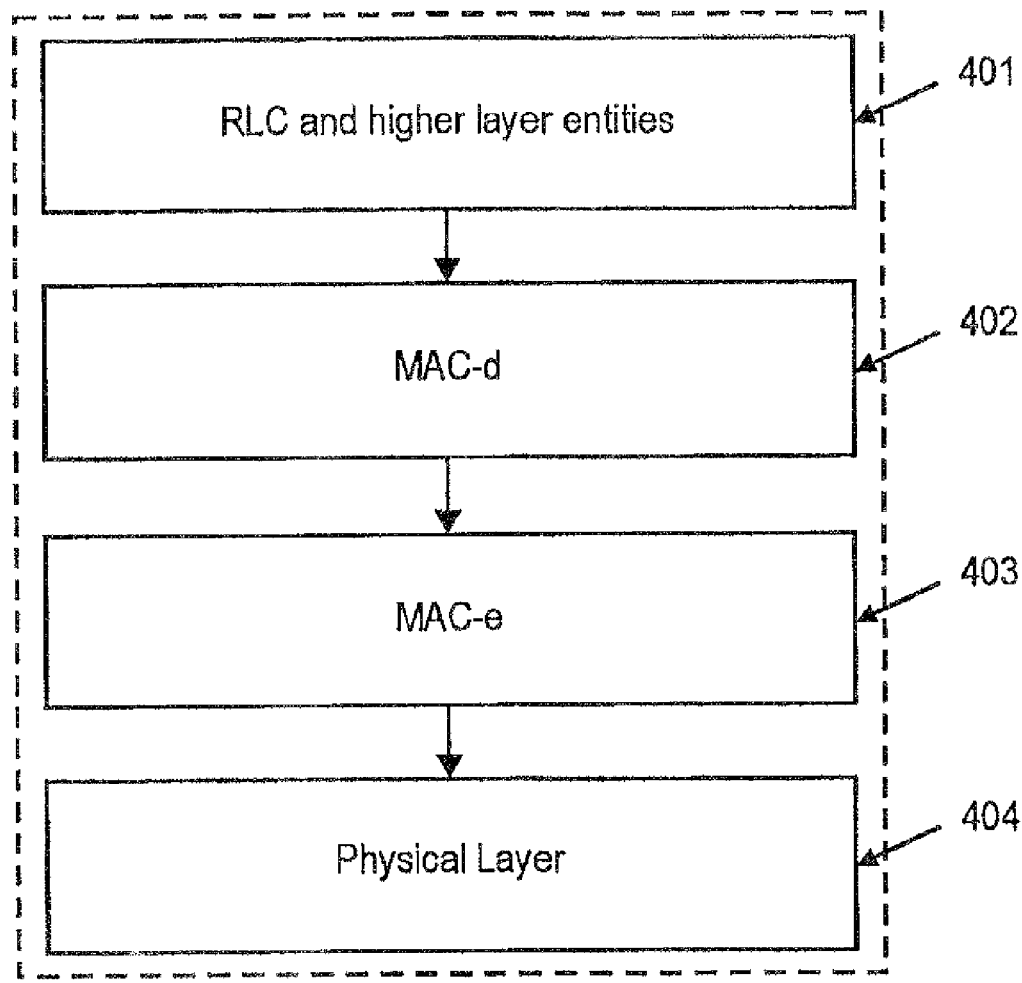
FIG. 4 shows the E-DCH MAC architecture at a user equipment.
Figure 5:
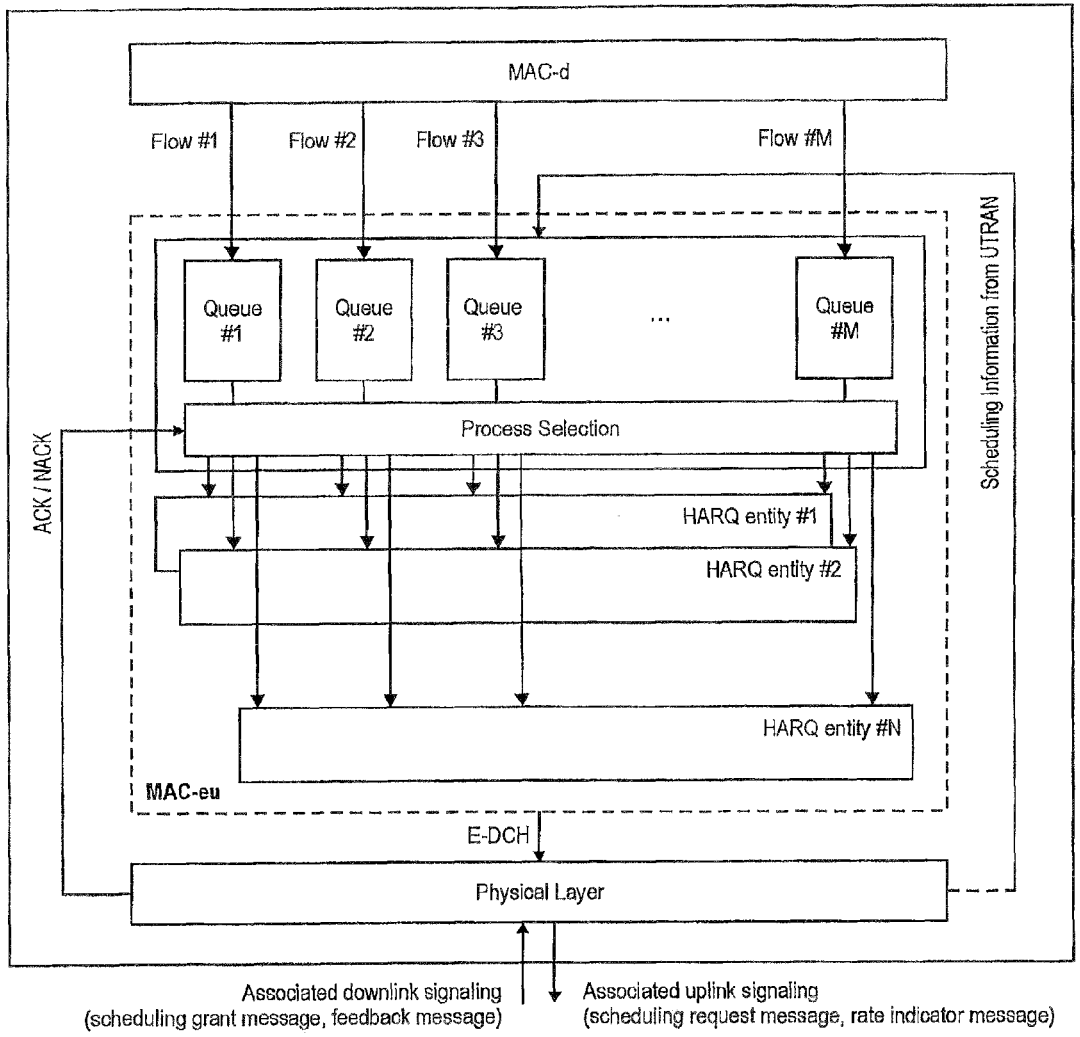
FIG. 5 shows the MAC-e architecture at a user equipment.
Figure 6:
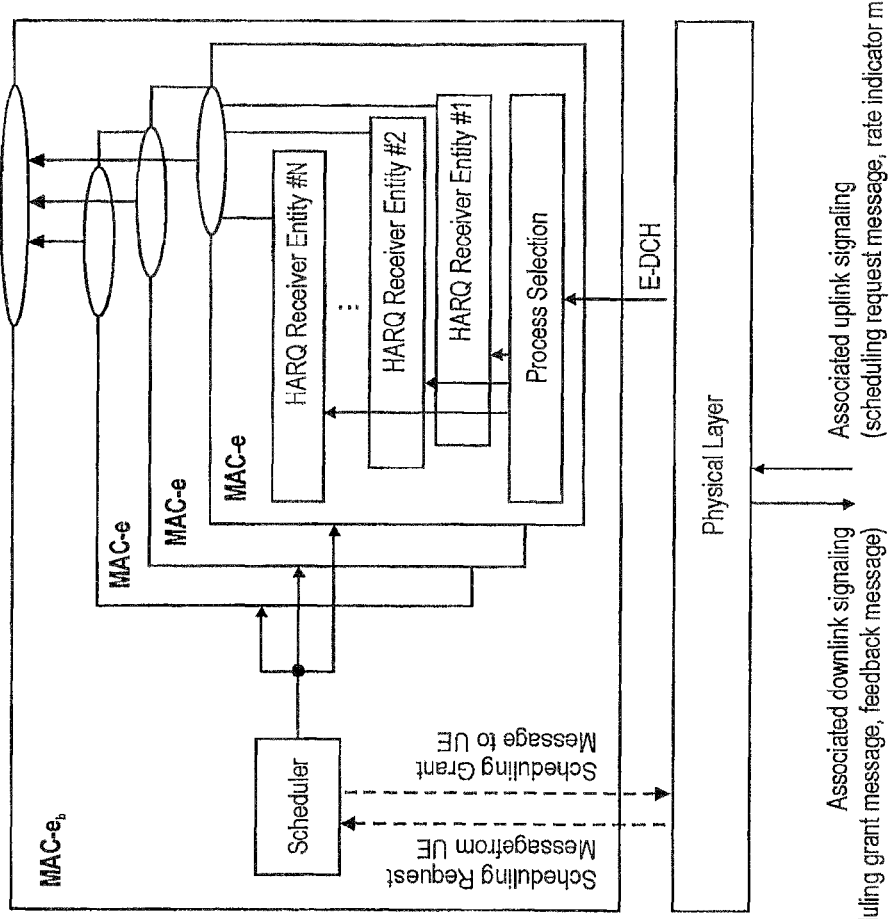
FIG. 6 shows the MAC-e architecture at a Node B.
Figure 7:
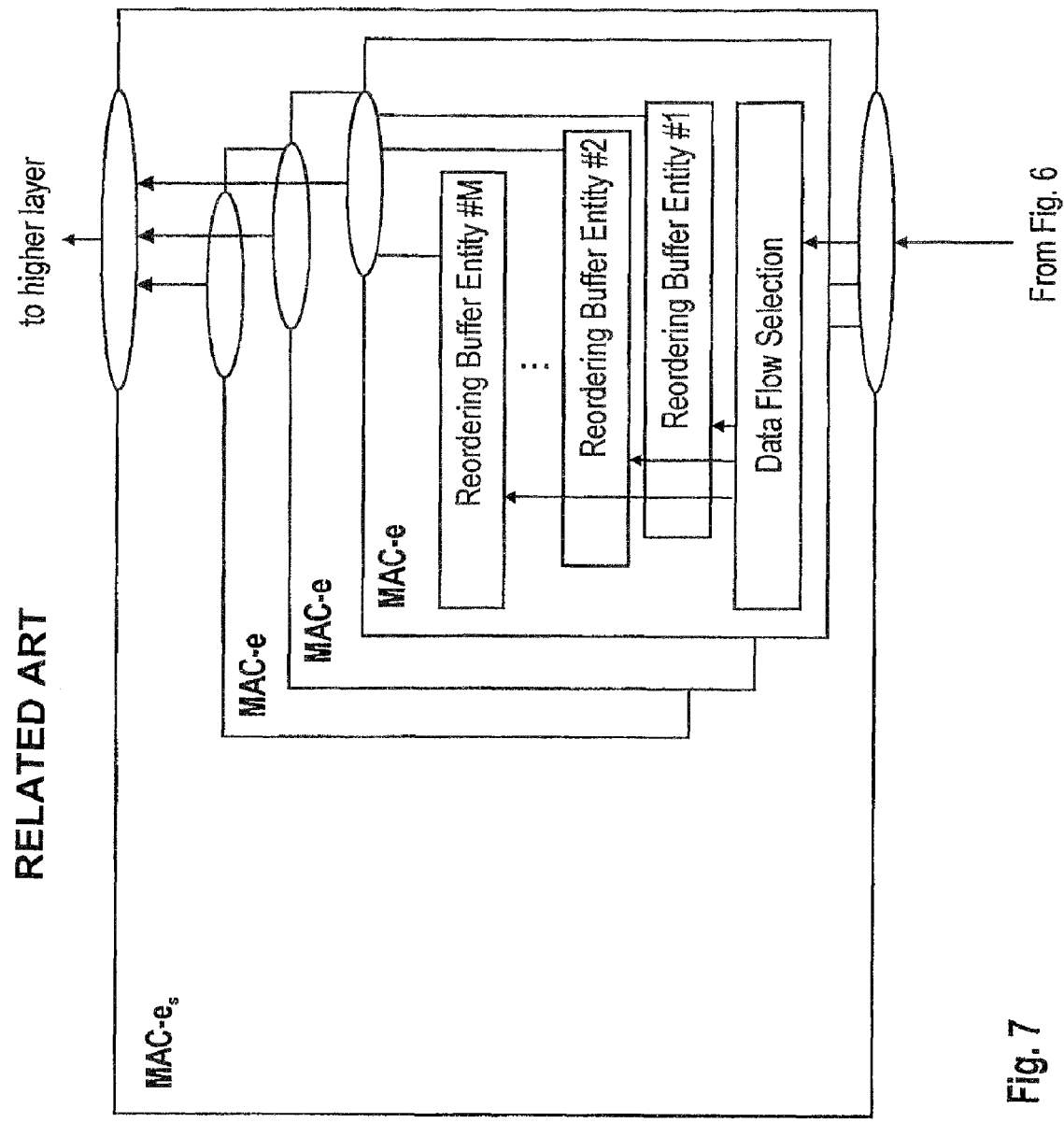
FIG. 7 shows the MAC-e architecture at a RNC.

The following paragraphs will describe various embodiments of the invention. For exemplary purposes only, most of the embodiments are outlined in relation to a UMTS communication system and the terminology used in the subsequent sections mainly relates to the UMTS terminology. However, the used terminology and the description of the embodiments with respect to a UMTS architecture is not intended to limit the principles and ideas of the inventions to such systems.

Also the detailed explanations given in the Technical Background section above are merely intended to better understand the mostly UMTS specific exemplary embodiments described in the following and should not be understood as limiting the invention to the described specific implementations of processes and functions in the mobile communication network.

The ideas and principles that will be outlined in the subsequent sections may be applicable to mobile communication systems providing uplink data transmissions during soft handover of a mobile terminal which are scheduled by base stations. Further, the principles outlined herein may be especially applicable to systems in which separate amounts of the allowable noise rise are allocatable for individual UEs and which therefore allow a noise rise management for UEs, especially during soft handover.

As indicated above, the invention may be for example suitable for being employed in a UMTS mobile communication system for uplink transmissions on an enhanced dedicated channel (E-DCH).

One embodiment of the invention proposes to introduce RoT management for uplink transmissions of a mobile terminal (e.g. UE) during soft handover, i.e. in situations where the mobile terminal communicates with more than one base station (e.g. Node B) simultaneously.

Considering the exemplary case where a single base station is responsible of scheduling the uplink transmissions of the mobile terminal in soft handover, this base station may select a maximum amount of uplink resources for the mobile terminal and may allocate the maximum amount of uplink resources to same. Further, the base station may indicate the selected maximum amount of uplink resources to a network entity controlling radio resources of the mobile terminal which decides whether to provide the other base stations communicating with the mobile terminal with information on maximum amount of uplink resources allocated to the mobile terminal, applicable to individual HARQ processes, by the scheduling controlling base station.

The selection and allocation of the maximum amount of uplink resources allocatable to the mobile terminal, applicable to individual HARQ processes, may be for example a part of the scheduling controlling NodeB's TFCS control. In the present UTRAN architecture, the radio network controlling entity is the S-RNC. Alternatively, when considering the evolved UTRAN architecture the serving NodeB may control radio resources of the mobile terminals.

Another embodiment considers the possibility that all base stations communicating with the mobile terminal during soft handover may actively schedule uplink transmissions from the mobile terminal. Hence, the different base stations may decide to allocate different maximum amounts of uplink resources to the terminal, applicable to individual HARQ processes, resulting in the undesirable effects on the RoT as described previously. In this embodiment of the invention, the base stations (or at least those who schedule transmissions on the uplink), may inform the radio resource control entity on the maximum amount of uplink resources allocated by each of the base stations to the mobile terminal.

The radio resource control entity may use different strategies to select one appropriate amount of uplink resources allocatable to the mobile terminal, applicable to individual HARQ processes, by all the base stations in communication with the mobile terminal. This selected amount of uplink resources may then be provided to the individual base stations which may use this information for scheduling the mobile terminals the respective base station is responsible for.

For example the radio resource control entity may select the lowest indicated amount of uplink resources or a combined amount of uplink resources, which may for example be the average amount of uplink resources determined based on indicated amounts of uplink resources.

These exemplary embodiments and variations thereof will be described in the following paragraphs for exemplary purposes in more detail with respect to uplink transmissions on the E-DCH and the present UTRAN architecture.

As already mentioned before one problem in a soft handover scenario is, that the Node Bs of the active set are not aware of the uplink interference situation of the other Node Bs within the active set. Furthermore the Node Bs may not be aware of the scheduling related commands, e.g. maximum allocatable data rate, signaled from the other active set Node Bs. One way to overcome this problem is to introduce some coordination among the active set Node Bs.

When having only one scheduling entity in soft handover, e.g. best downlink cell, the non-scheduling Node Bs are not aware of the maximum allocated TFC (maximum data rate) from the scheduling Node B. Therefore the UE could cause some significant amount of unexpected uplink noise rise in the radio cells of those non-scheduling Node Bs.

In order to avoid this unexpected uplink noise rise and hence to provide a more efficient RoT control, the scheduling Node B may inform the other active set Node Bs about the maximum allocated TFC to the UE. For example this may be achieved by control signaling via the Iub/Iur interfaces.

First, the scheduling Node B may determine the maximum TFC (data rate) for the UE e.g. based on uplink interference situation in its own cell and/or based on scheduling requests from the UE. The scheduling Node B may signal the "maximum allocated TFC" to the S-RNC for example by control signaling via Iub/Iur.

The S-RNC may next inform the other active set Node B about the "maximum allocated TFC" by control signaling via Iub/Iur. The active set's Node Bs may take this signaled value into account for uplink noise rise management in their radio cells. Since the other non-scheduling Node Bs are now aware of the allocated maximum TFC, no unexpected uplink noise rise is caused by the UE. The Node Bs can take this signaled "maximum TFC" for the scheduling of other UEs within their respective radio cell.

In a variation, the scheduling Node B may for example inform the other active set Node Bs about the maximum UE allocated data rate, every time it schedules the UE in soft handover. In another variation the scheduling Node B may inform the other Node Bs within the active set about a new allocated maximum TFC, in case there is a significant difference compared to the previous allocated maximum TFC. The significance of the difference may for example be determined based on a threshold. This operation may for example reduce the Iub/Iur signaling overhead.

Figure 12:
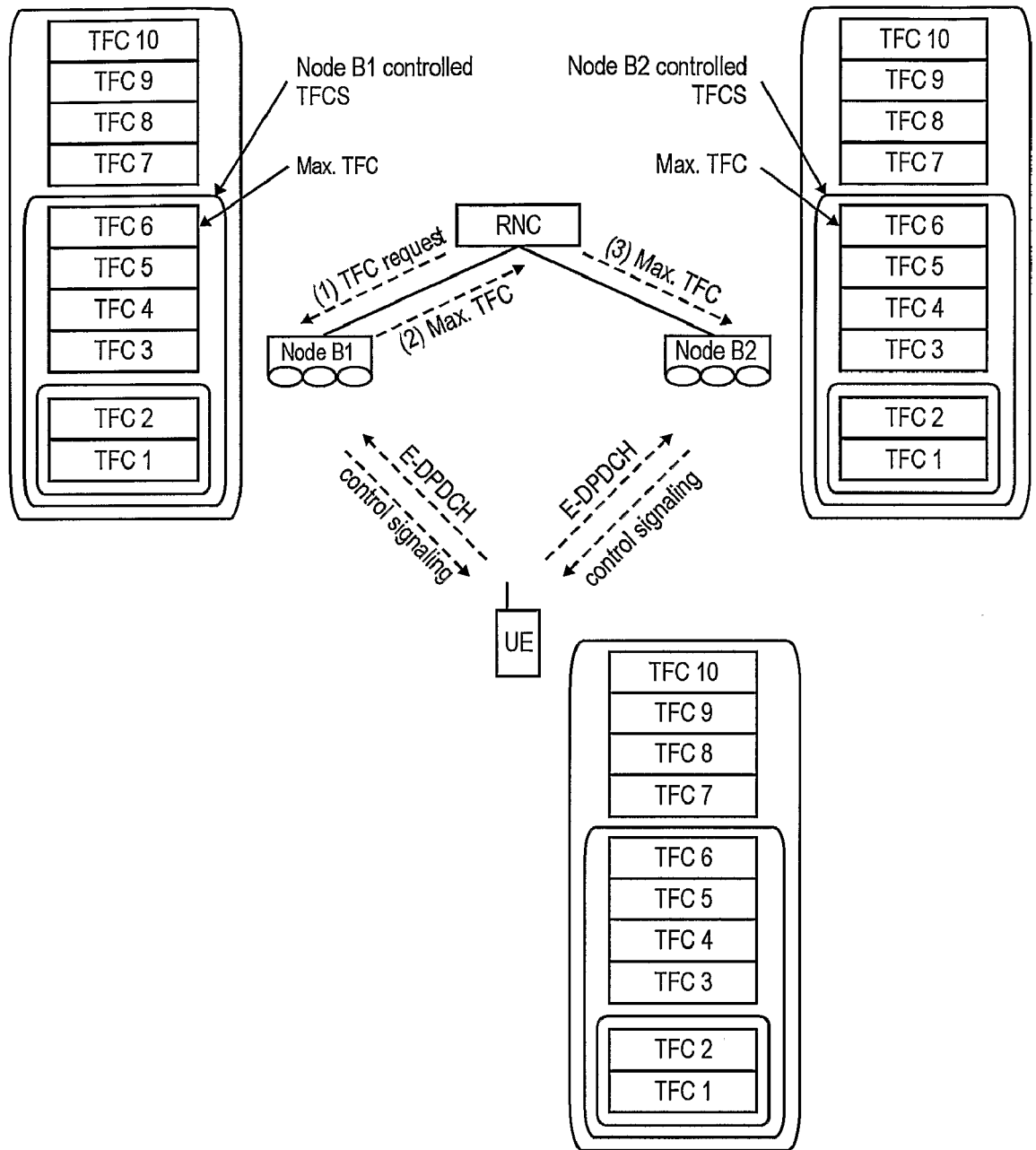
FIG. 12 shows the coordination of Node Bs using Iur/Iub signaling according to an embodiment of the invention.

One example, which is intended to exemplarily demonstrate the above described method, is shown in FIG. 12. The UE is first only in connection to Node B1. The "Node B1 controlled TFC subset" is updated in the Node B1 and UE accordingly based on control signaling between UE and Node B1. When UE enters soft handover a new radio link is established between UE and Node B2, i.e. Node B2 is added to the active set.

When the S-RNC triggers the active set update procedure based on the measurement results reported from the UE, it may request Node B1 to signal the "maximum TFC" allocated to the UE. The S-RNC may convey the received information on "maximum TFC" from Node B1 to Node B2.

Considering for exemplary purposes the radio link addition in an UMTS network, the addition of a new radio link to the active set requires some Iub and RRC signaling. Therefore, there may be no problem in terms of delay by applying the proposed mechanism.

Upon having received "maximum TFC" from S-RNC Node B2 can reserve resources for the UE and manage Uplink noise rise in its cell more efficient.

In another exemplary soft handover scenario according to a further variation of this embodiment, multiple Node Bs are allowed to send scheduling commands to the UE, for example all active set Node Bs are controlling the uplink transmission by TFC restriction.

Figure 14:
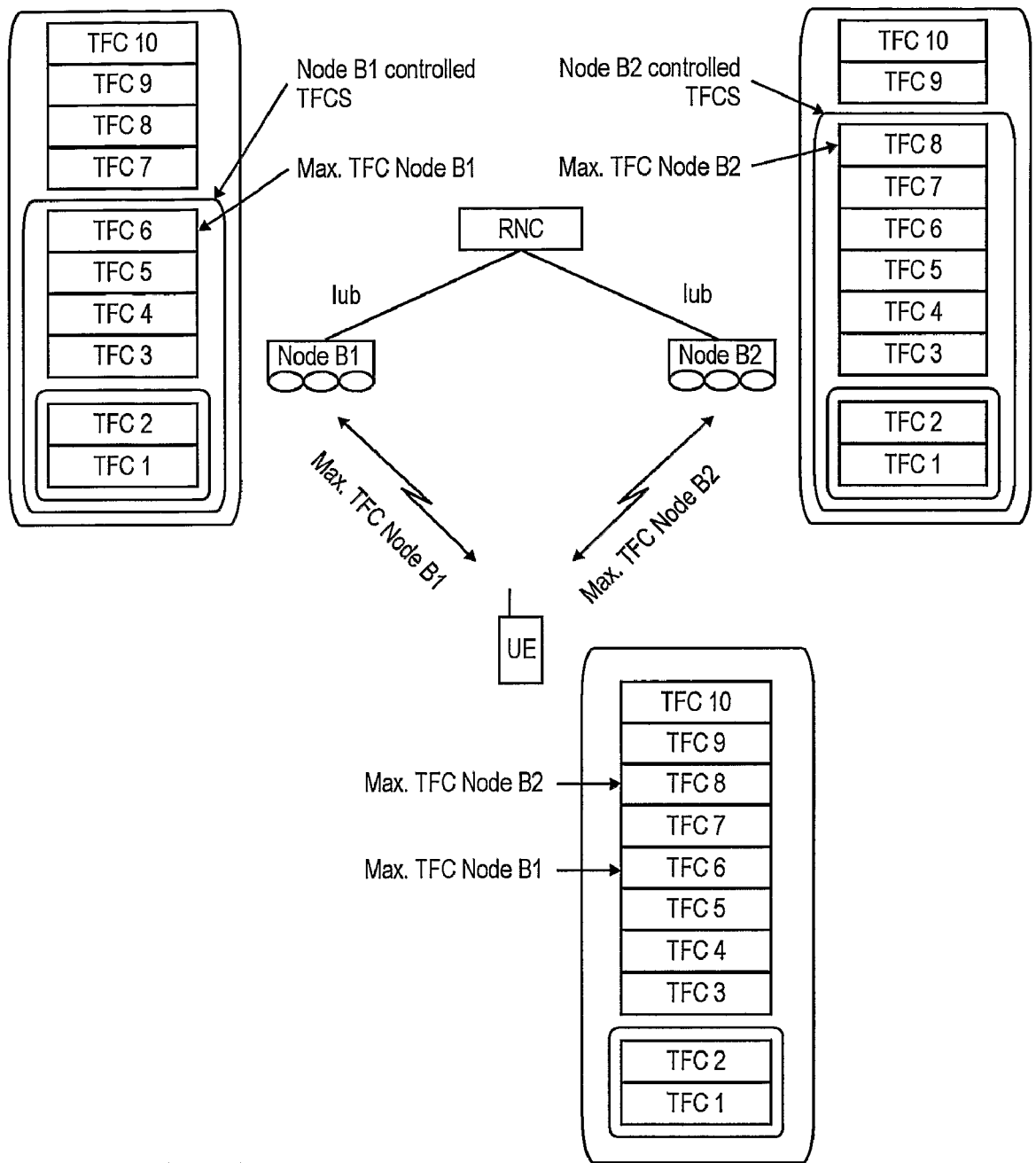
FIG. 14 shows the a method for controlling the RoT within a cell by using an adaptive target RoT value to be kept by the Node B according to another embodiment of the invention.

When assuming for exemplary purposes the soft handover scenario shown in FIG. 14, Node B1 allocates data rates up to TFC6 and Node B2 up to TFC8 to the UE according to the uplink interference situation in their own cells. In order to optimize the uplink noise rise management, the active set's Node Bs may signal their UE allocated "maximum TFC" to the S-RNC. The S-RNC may determine an "adopted maximum TFC" and inform the active set's Node Bs on the determined "adopted maximum TFC".

The Node Bs may take the signaled value into account for the scheduling of other UEs, e.g. reallocating unused resources. In this exemplary operation the "adopted maximum TFC" may be determined by the network (S-RNC). When considering an evolved UTRAN architecture the tasks of the S-RNC may be performed by the serving Node B.

The determination of the "adopted maximum TFC" may depend on the UE behavior in case of receiving multiple scheduling commands. When the UE is for example obliged to choose always the lowest allocatable data rate as the maximum E-DCH transmission data rate, then the S-RNC should also choose the lowest allocated TFC as the "adopted maximum TFC".

Figure 8:
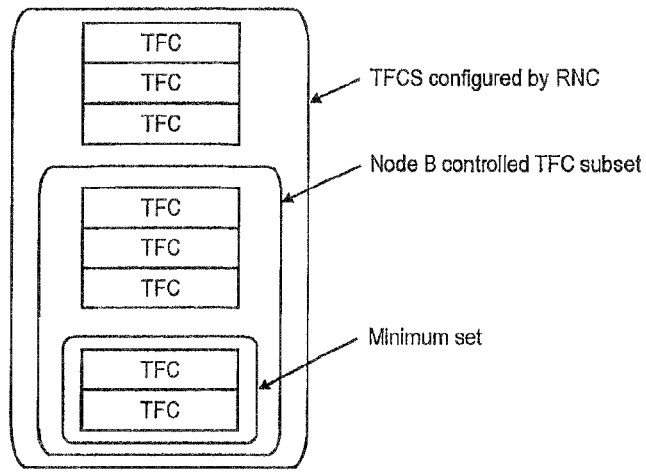
FIG. 8 shows transport format combination sets for Node B controlled scheduling.
Figure 9:
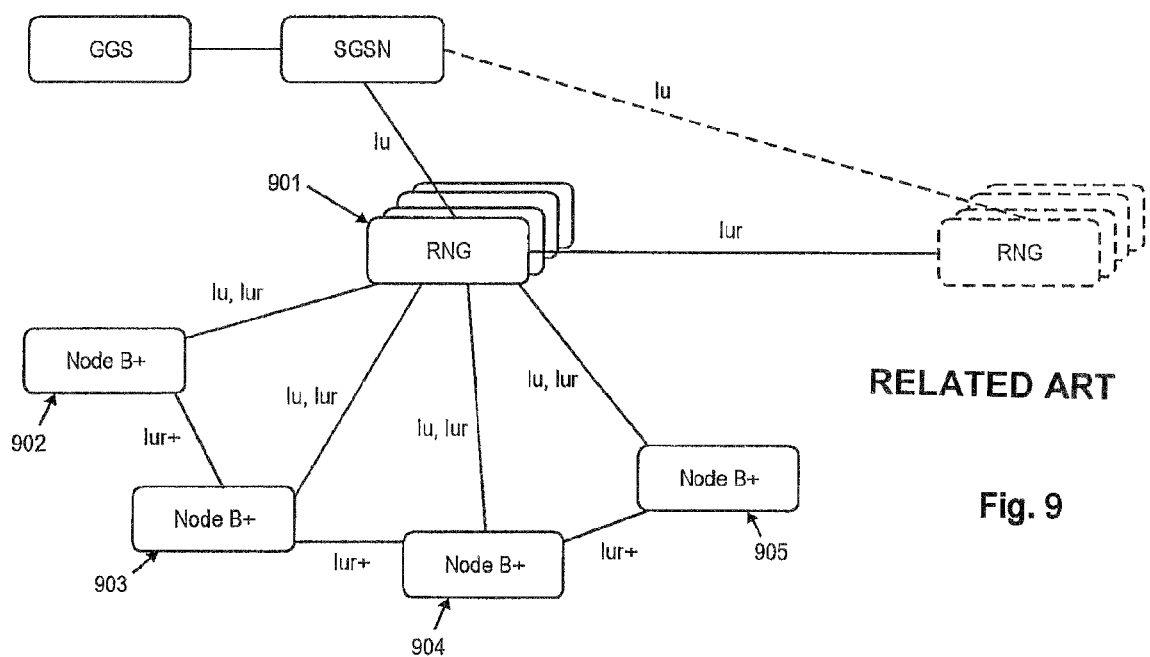
FIG. 9 shows an exemplary Evolved UTRAN architecture.
Figure 10:
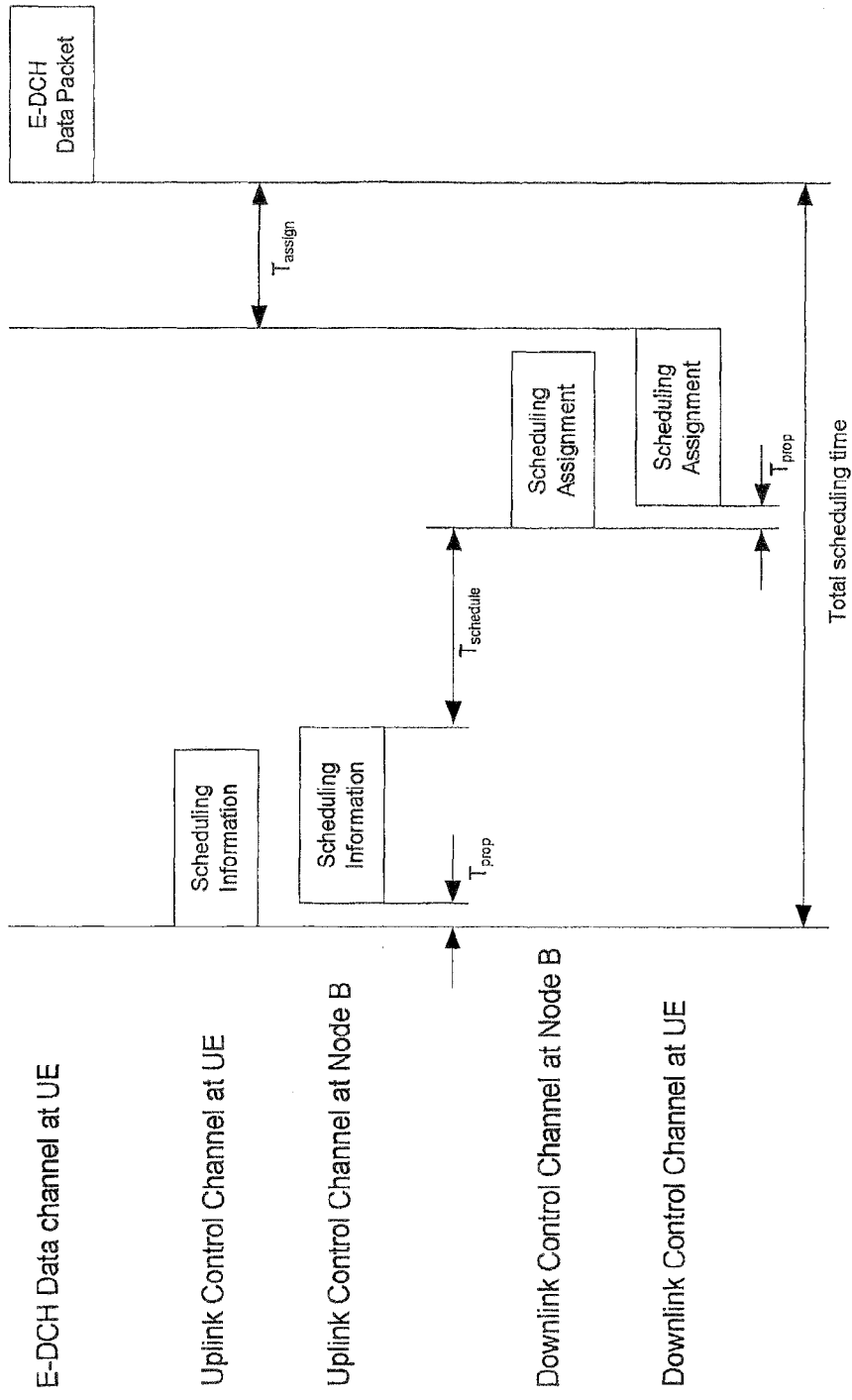
FIG. 10 shows an exemplary scheduling of uplink transmissions in a time and rate scheduling mode.
Figure 11:
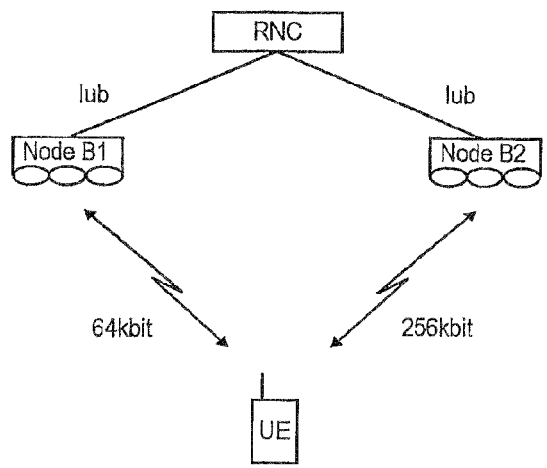
FIG. 11 shows an exemplary Node B controlled scheduling of a UE during soft handover.

In order to reduce Iub/Iub control signaling overhead, in another variation of this embodiment, the S-RNC may signal only the "adopted maximum TFC" to those active set Node Bs, whose allocated maximum TFC differs largely from the "adopted maximum TFC", e.g. the difference exceeds a threshold. It should be noted that there may be one TFCS configured by the S-RNC for an individual UE, such that all Node Bs in the active set of this UE may base Node B controlled scheduling by TFC restriction based on this one S-RNC configured TFCS (see FIG. 8).

In a different variation of this embodiment the RNC may coordinate the resource allocation among the active set's Node Bs based on, for example, the cell load or uplink interference situation in the respective cells. Due to the RNC providing admission control, which is a Radio Resource Utilization method, the current load situation of the target and the surrounding cells in the network may already be known to the RNC. A Node B in the active set may measure the uplink interference in its cell and may report the measurement results to the RNC, e.g. via NBAP signaling.

Since the RNC is aware of the cell load and uplink interference situation of the active set Node Bs, it may decide based on this knowledge when coordination of the allocated resources shall be performed, e.g. an "adopted maximum TFC" should be signaled to the active set Node Bs.

The coordination among the active set's Node Bs by the S-RNC may for example be performed every time the UE sends a scheduling request to the Node Bs or it could also be triggered by the S-RNC, e.g. when updating the active set.

As described above efficient RoT control can be provided in soft handover by coordination among active set Node Bs via Iub/Iub signaling. The scheduling Node B or multiple Node Bs in the active set may inform the other Node Bs within the active set about their allocatable maximum TFC. In the Rel99/4/5 UMTS architecture this informing may be done by Iub/Iub signaling via the S-RNC.

In the evolved UTRAN architecture the Node B+s may be interconnected by the Iur+ interface. The above described methods using control signaling between the active set Node Bs can also be applied to the evolved UTRAN architecture. The Node B+s, either only the scheduling Node B+ or all active set Node B+s, inform the other Node B+s within the active set directly about the maximum allocatable TFC via the Iur+ interface by sending control information.

Another variation of the embodiment considers scheduling in the power domain. When scheduling is done in the power domain the scheduling entity may not restrict the uplink data rate of the UE by TFC restriction, but may alternatively control the uplink transmission power.

In a CDMA system the interference seen by a mobile station is a function of the transmit powers of interfering users. The transmit power is usually directly linked to the data rate. A smaller bit rate for example requires lower transmit power to obtain the same quality (assuming that channel conditions do not change). Therefore, to achieve desired performance for all users and in order to control the uplink noise rise in a cell a Node B may directly control the transmit power of a user. One exemplary possible implementation may be to control the gain factor of the E-DPDCH. In this approach the power ratio to the DPCCH is signaled to the UE.

According to this variation of the embodiment of the invention, an efficient RoT control in soft handover may also be achieved by using power domain scheduling. In that case an "adopted maximum power ratio" would be for example signaled between the active set's Node Bs similar to the methods described above.

Another embodiment of the invention relates to further alternative solution for managing the rise over thermal by a radio resource controlling network entity of the mobile terminal in soft handover. In order to maintain the level of inter-cell interference at a reasonable level, according to this embodiment, the RNC (acing as the radio resource controlling network entity) may for example control the target RoT within a cell controlled by an individual Node B.

Figure 13:
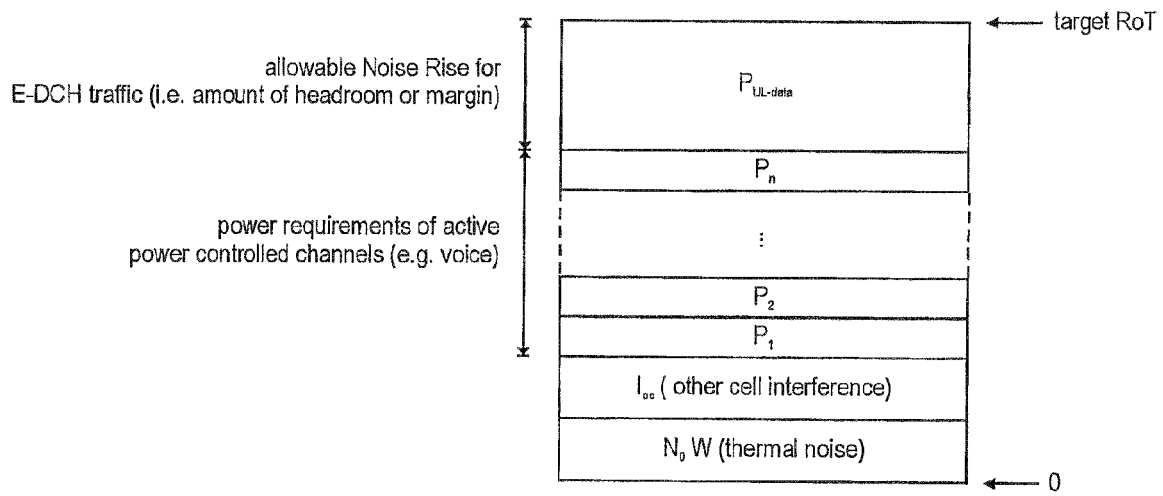
FIG. 13 shows an exemplary method controlling the RoT of uplink transmissions of a UE in soft handover according to an embodiment of the invention.

The total RoT at the Node B may for example result from thermal noise, other cell interference, uplink data transmissions from (Rel99) channels and the E-DCH channels. The load caused by real-time traffic, interference from other cell users and noise together is called the non-controllable load. The available capacity, RoT margin, which can be used for the scheduling of E-DCH traffic is the capacity, which is not used for the non-controllable load, which is shown in FIG. 13.

Large RoT variations in a cell may have the effect on neighboring cells as large variation of inter-cell interference. Since the accuracy of inter-cell interference measurements in a Node B is more degraded when the fluctuation of the inter-cell interference gets higher, Node B may experience unexpected noise rise which may have an impact on the quality of the uplink channels. To control the inter-cell interference, especially in a SHO scenario, the RNC could limit (control) the target RoT of the cells.

By reducing the target RoT in a cell, the inter-cell interference in neighboring cells is also reduced. The RNC may for example signal the target RoT to the Node Bs. The RNC may evaluate the noise rise caused by the individual Node Bs in their neighboring cells and may influence the Node B controlled scheduling by adjusting the target RoT available to a respective Node B to better control the noise rise within neighboring cells.

Another embodiment of the invention provides an alternative solution for providing efficient RoT control in soft handover by using feedback signaling from the UE.

Some problems in a soft handover scenario may result from to the decentralized scheduling in HSUPA (High Speed Uplink Packet Access). Since a scheduling Node B is for example not aware of the uplink noise rise situation of the other active set Node Bs, E-DCH transmissions according to the scheduling Node B's allocatable maximum data rate may cause significant amount of unexpected noise rise in other active set Node Bs.

In the following a method for efficient RoT control by using UE feedback signaling is described in an exemplary soft handover scenario.

When a UE is in a non-soft handover state, it is in connection with only one Node B. The scheduler in this Node B controls, within the limits set by the RNC, the set of TFCs from which the UE may choose a suitable TFC for transmission on the E-DCH. The "Node B controlled TFC subset" is signaled to the UE in form of a TFC pointer pointing to the maximum allowed TFC. This pointer is updated in the UE and the Node B accordingly by scheduling related control signaling. In the exemplary soft handover scenario shown in FIG. 14 the "Node B1 controlled TFC subset" comprises TFCs up to TFC6. Hence the TFC pointer is pointing to TFC6.

When the UE enters soft handover, Node B2 is added to the active set. Node B2 allocates resources to the UE, determines the "Node B2 controlled TFC subset", according to the uplink interference situation in its cell. Node B2 signals the maximum allowed TFC (TFC pointer) to the UE. In the example the "Node B2 controlled TFC subset" comprises all TFCs in the TFCS up to TFC8. Therefore the UE has 2 different TFC pointers in its TFCS pointing to the maximum TFC scheduled by the corresponding Node Bs.

There are different options on how UE can resolve this situation. The UE may either follow a "conservative" strategy meaning that the UE selects the lowest allocated maximum data rate indicated by the TFC pointers. Thus, no unexpected noise rise will be caused in the cells, since the UE selects a data rate that is within each NodeB controlled TFCS. When signaling the UEs decision to all Node Bs in the active set, all of the active set's Node Bs are aware of and may manage uplink noise rise in their own cell.

Alternatively, the UE may also use an "aggressive" strategy to resolve the ambiguity, i.e. the UE may select the highest allocated data rate. This strategy would provide higher throughput for the UE, but on the other hand could cause a significant amount of unexpected noise rise in Node Bs, which reserved resources for only smaller data rates. Of course further alternatives exist, such as the UE may select an intermediate data rate higher than the lowest data rate but lower than the highest data rate it has been allowed to use.

In case the UE adopts the conservative strategy it may follow the commands from Node B1 in the exemplary soft handover scenario shown in FIG. 14. However since Node B2 is not aware of the maximum data rate allocatable by Node B1, it has effectively allocated noise rise that will not be used by the UE.

Therefore the UE may determine the so called "adopted maximum data rate" (maximum TFC) based on the maximum TFCs signaled from Node B1 and NodeB2 by applying one of the strategies mentioned before and signal this determined value to the Node Bs in the active set. The determination of the "adopted maximum TFC" could be also based for example on the available UE transmits power or buffer occupancy.

When the UE signals the "adopted maximum TFC" (maximum data rate) to the active set Node Bs, there will be no unexpected uplink noise in the active set cells caused by this UE, since the Node Bs are now aware of the maximum data rate of E-DCH transmissions from this UE.

Figure 15:
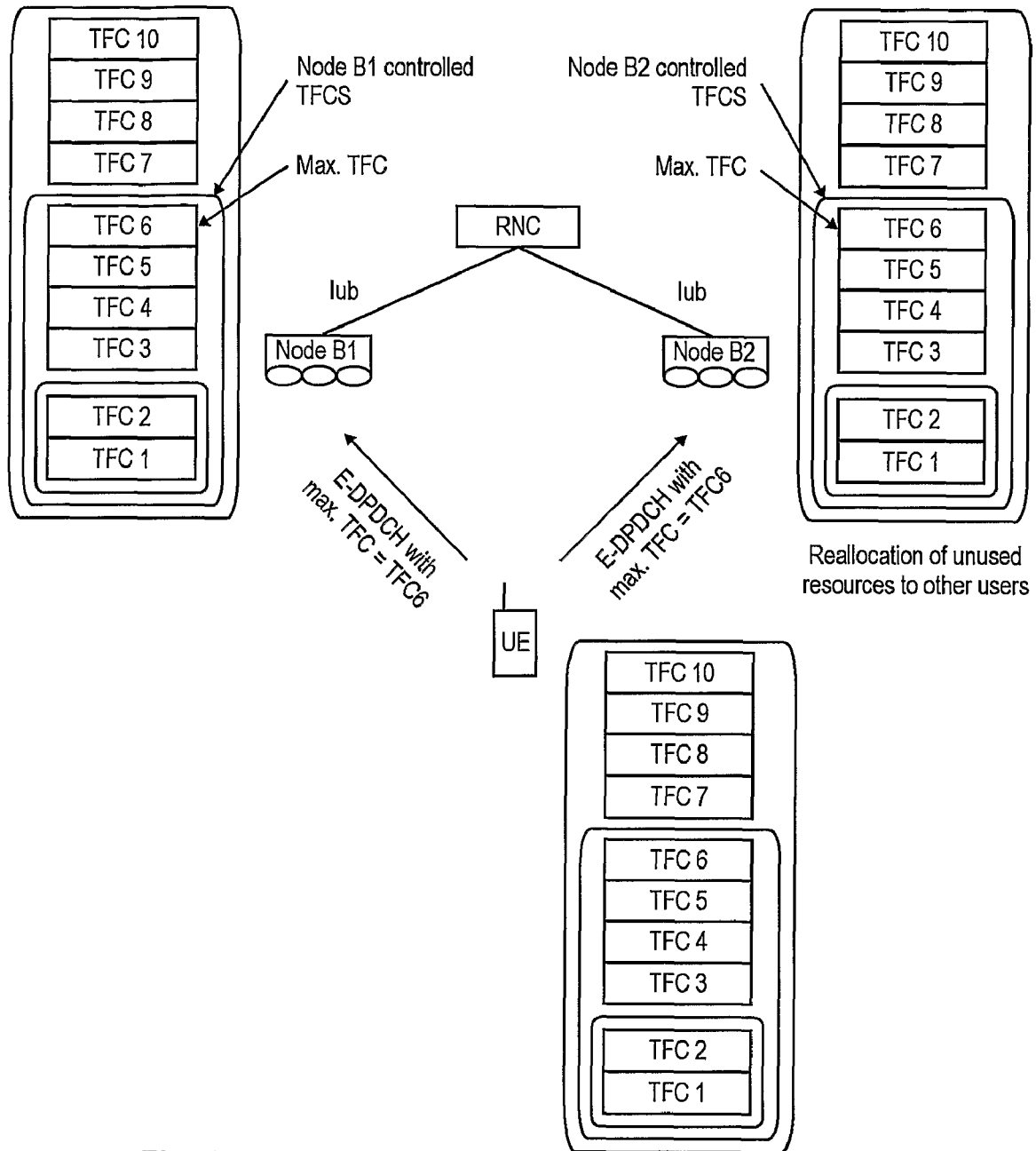
FIG. 15 shows an exemplary method of Node Bs controlling the maximum TFCs of a UE during soft handover.

The Node Bs can take this signaled TFC limit into account for the scheduling of other UEs in the cell, which provides a better RoT control and hence increased capacity. Node B2 could for example reallocate reserved unused resources to other UEs in case the terminal would adopt the conservative strategy. FIG. 15 shows the exemplary soft handover scenario from FIG. 14 according to an embodiment of the invention after applying a RoT control method. Hence, in this aspect the controlling of the RoT by UE signaling and by Node B signaling is similar.

From a procedural viewpoint, the method according to this illustrative embodiment may be described as follows. The active set's Node Bs may allocate a maximum data rate (TFC) to a UE in SHO based on for example the uplink noise rise situation in their cell and scheduling related control signaling from the UE. The maximum allocated TFC (TFCS pointer) is signaled to the UE. The UE may determine "adopted maximum TFC" based on the signaled maximum allocated data rates from the active set Node Bs, e.g. lowest allocatable data rate (TFC) and may signal the determined "adopted maximum TFC" to the active set Node Bs. Next, the active set's Node Bs may schedule other UEs in their cell taking into account the signaled "adopted maximum TFC".

This exemplary procedure may also be used when having only one scheduling entity in a soft handover scenario. Since the non-scheduling Node Bs are not aware of the UE allocated maximum data rate, the E-DCH transmissions may cause unexpected uplink noise rise in those cells. Therefore when UE signals the maximum data rate allocated from the scheduling entity to the active set Node Bs, the Node Bs can consider this value for a more precise uplink noise rise management in their cells.

In order to reduce the signaling overhead and hence the uplink interference caused by the signaling of "adopted maximum TFC", a variation of this method may be that the UE signals only the "adopted maximum TFC" to the active set Node Bs when the difference in rate restriction between the Node Bs is large, e.g. exceeds a predetermined threshold. The UE may signal the "adopted maximum TFC" by using either physical layer signaling or RRC signaling.

Using physical layer signaling, the "adopted maximum TFC" may be for example signaled by reusing the enhanced dedicated physical control channel (E-DPCCH), which is associated to the dedicated physical data channel the E-DCH is transmitted on.

Figure 16:
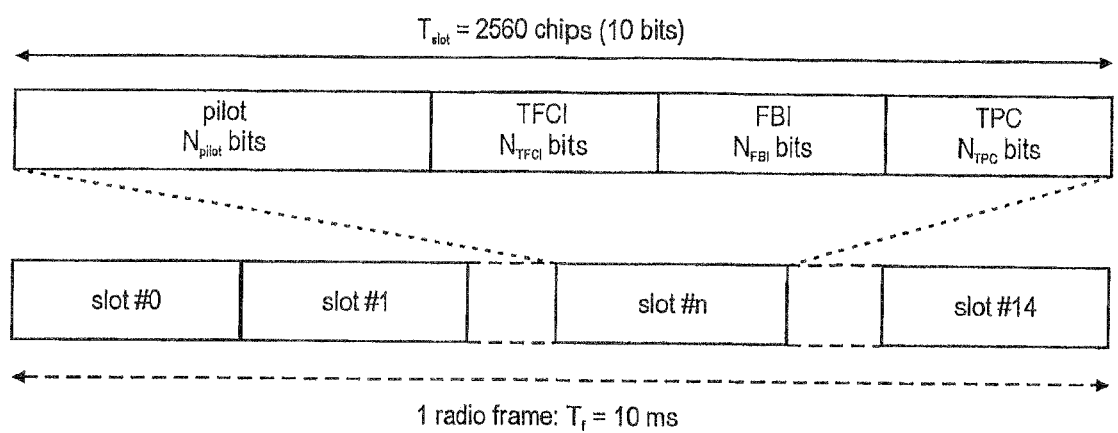
FIG. 16 shows the Rel99/4/5 uplink DPCCH frame structure.

An enhanced frame structure of the E-DPCCH according to one embodiment of the invention could be based on the frame structure of the Rel99/4/5 DPCCH, which is shown in FIG. 16.

The uplink DPCCH uses a slot structure with 15 slots over the 10 ms radio frame. Each slot has four fields to be used for pilot bits, TFCI bits, Transmission Power Control (TPC) bits and Feedback Information (FBI) bits. The transport-format combination indicator (TFCI) informs the receiver about the instantaneous transport format combination of the DCH mapped to the simultaneously transmitted uplink DPDCH radio frame (dedicated physical data channel). The TFCI carries the transport format of the same frame.

When the UE signals the "adopted maximum TFC" to the active set Node Bs, there may be no data on the E-DPDCH in the same frame. As Node Bs would try to decode the E-DPDCH frame, which could lead to errors, it may be feasible to explicitly indicate to the Node Bs that no data are present on the DCH.

As an enhancement according to this embodiment of the invention, for example an extra 1-bit flag as an indication for the presence of data on the E-DPDCH may be used. When the flag is set it informs the Node Bs that the TFCI value in the respective field of each slot in the DPCCH structure corresponds to the "adopted maximum TFC" the UE is using in the soft handover. Hence the active set Node Bs may not try to decode the corresponding E-DPDCH frame but only extract the TFCI value and interpret it as the "adopted maximum TFC".

In case the flag is not set, usual operation for uplink data transmission on E-DCH may be performed.

Another possibility to indicate the presence of data on the on the E-DPDCH without explicitly signaling by means of a flag may be that the frame structure of FIG. 16 is used and that the signaling of "adopted maximum TFC" is directly indicated by the TFCI value. For example in case the leading bit of the TFCI value is set to 1 this may indicate an "adopted maximum TFC" being signaled, i.e. no data on the E-DPDCH. The bits following the initial bit then define the adopted TFC value. In case the leading bit of the TFCI value is 0, the remaining bits indicate the TFC used for the transmitted uplink data on the E-DPDCH.

Alternatively, the UE may also inform the active set Node Bs about the "adopted maximum TFC" by using RRC signaling. The UE may signal the TFC limit to the RRC entity in the S-RNC first, which would then convey the value to the active set Node Bs via Iub/Iub signaling. However this method may experience significant longer signaling delays compared to physical layer signaling, due to the Iub/Iub interface delay and the 80 ms interleaving length used for RRC signaling.

The invention claimed is:

1. A method for communicating information relating to the scheduling of uplink data transmissions, wherein a mobile terminal transmits uplink data via an Enhanced Uplink Dedicated Channel (E-DCH) of a Universal Mobile Telecommunication System (UMTS) to a plurality of base stations during soft handover of the mobile terminal in a mobile communication system, and wherein at least one scheduling base station of said plurality of base stations schedules uplink data transmissions of the mobile terminal in soft handover, the method comprising:
    determining, at the at least one scheduling base station of said plurality of base stations, scheduling information for the mobile terminal indicative of a maximum amount of uplink resources allocated to the mobile terminal for scheduled uplink data transmissions on the E-DCH by the mobile terminal,
    transmitting, from the at least one scheduling base station, the scheduling information to at least one other base station of said plurality of base stations to inform the at least one other base station on the mobile terminal's allocated maximum amount of uplink resources for uplink data transmissions on the E-DCH,
    scheduling, by the at least one other base station, at least one other mobile terminal in communication with a respective base station based on the information received from the at least one scheduling base station,
    determining at the at least one scheduling base station new scheduling information for the mobile terminal indicative of a new allocated maximum amount of uplink resources allocated to the mobile terminal for uplink data transmission on the E-DCH,
    signaling by the at least one scheduling base station the determined new scheduling information to the mobile terminal in soft handover to allocate to the mobile terminal the new maximum amount of uplink resources applicable on the E-DCH for uplink data transmissions, and
    informing said other base stations on the allocated new amount of uplink resources, if a difference between the new mobile terminal's allocated maximum amount of uplink resources for uplink data transmissions on the E-DCH and the previous mobile terminal's allocated maximum amount of uplink resources for uplink data transmissions on the E-DCH is larger than a predetermined threshold value.

2. The method according to claim 1, further comprising signaling by said at least one scheduling base station the determined scheduling information to the mobile terminal in soft handover to allocate the maximum amount of uplink resources to the mobile terminal for uplink data transmissions on the E-DCH.

3. The method according to claim 1, wherein the maximum amount of uplink resources for uplink data transmissions on the E-DCH indicates the maximum data rate or the maximum uplink transmission power ratio that may be used by the mobile terminal for uplink transmissions using the E-DCH.

4. The method according to claim 2, wherein the at least one scheduling base station schedules uplink data transmissions by controlling the Transport Format Combination Set (TFCS) available to the mobile terminal in soft handover for uplink data transmission or by controlling the uplink transmission power ratio of the mobile terminal.

5. The method according to claim 1, wherein the scheduling information indicating the mobile terminal's maximum amount of uplink resources for uplink data transmission on the E-DCH is transported via a serving radio network controller, and
    wherein indicating the mobile terminal's allocated maximum amount of uplink resources for uplink data transmission on the E-DCH comprises:
    signaling the mobile terminal's allocated maximum amount of uplink resources for uplink data transmissions on the E-DCH from the at least one scheduling base station to the serving radio network controller, and
    informing the mobile terminal's allocated maximum amount of uplink resources for uplink data transmissions on the E-DCH to the other base stations by the serving radio network controller.

6. The method according to claim 5, wherein the serving radio network controller determines whether to forward the mobile terminal's allocated maximum amount of uplink resources for uplink data transmissions on the E-DCH to a respective one of said other base stations based on cell interference within the radio cell controlled by the respective one of said other base stations.

7. The method according to claim 1, wherein the indicated mobile terminal's maximum amount of uplink resources for uplink data transmissions on the E-DCH for is transported using control signaling.

8. The method according to claim 1, wherein the scheduling base station determines, signals and indicates the mobile terminal's allocated maximum amount of uplink resources for uplink data transmissions on the E-DCH for the mobile terminal in soft handover each time the mobile terminal in soft handover is scheduled by the scheduling base station.

9. The method according to claim 1, further comprising receiving by the at least one scheduling base station information indicating the predetermined threshold value from a serving radio network controller.

10. The method according to claim 4, wherein the plurality of base stations defines the active set of the mobile terminals in soft handover and
    wherein the method further comprises adding a base station to the active set of the mobile terminals and signaling the mobile terminal's allocated maximum amount of uplink resources for uplink data transmissions on the E-DCH for the mobile terminal in soft handover to said added base station by the serving radio network controller.

11. The method according to claim 10, wherein information for signaling of the mobile terminal's maximum amount of uplink resources for uplink data transmissions on the E-DCH to said added base station is comprised within a message communicated during the active set update procedure.

12. The method according to claim 1, wherein one base station of said plurality of base stations schedules uplink data transmissions of the mobile terminal in soft handover to all base stations of said plurality of base stations.

13. The method according to claim 1, wherein each of said base stations schedules uplink data transmissions of the mobile terminal in soft handover to the respective one of said plurality of base stations.

14. The method according to claim 13, wherein each of the plurality of base stations determines scheduling information for the mobile terminal indicative of an allocated maximum amount of uplink resources for uplink data transmission on the E-DCH allocated to the mobile terminal by the respective base station, and signals the determined scheduling information to the mobile terminal in soft handover to allocate the maximum amount of uplink resources for uplink data transmissions using the E-DCH to the terminal for uplink data transmission to the respective base station.

15. The method according to claim 14, further comprising choosing by the mobile terminal the lowest assigned maximum amount of uplink resources for uplink data transmissions using the E-DCH for uplink transmissions to all base stations of the plurality of base stations.

16. The method according to claim 15, further comprising forming by the mobile terminal a combined maximum amount of uplink resources on the assigned maximum amounts of uplink resources for uplink data transmissions using the E-DCH, which is used by the mobile terminal for uplink transmissions to all base stations of the plurality of base stations.

17. The method according to claim 14, wherein each of the plurality of base stations indicates its maximum amount of uplink resources for uplink data transmissions on the E-DCH allocated to the mobile terminal to a serving radio network controller and at least a subset of the plurality of base stations schedules at least one mobile terminal in communication with the respective base station taking into account a combined value or a lowest value of a maximum amount of uplink resources for uplink data transmissions on the E-DCH signaled to the respective base station from the serving radio network controller.

18. The method according to claim 17, further comprising determining at the serving radio network controller a combined value or a lowest value of a maximum amount of uplink resources based on the maximum amounts of allocated resources indicated by the plurality of base stations and signaling the combined value or the lowest value of a maximum amount of uplink resources for uplink data transmissions on the E-DCH from the serving radio network controller to a subset of said plurality of base stations.

19. The method according to claim 18, wherein the combined value or the lowest value of a maximum amount of uplink resources is signaled to those base stations having indicated a maximum amount of uplink resources for uplink data transmissions using the E-DCH different from the combined value or the lowest value.

20. The method according to claim 1, further comprising requesting by a serving radio network controller from at least one base station of said plurality of base stations to signal the mobile terminal's allocated maximum amount of uplink resources for uplink data transmissions on the E-DCH for the mobile terminal in soft handover to said serving radio network controller.

21. The method according to claim 1, wherein the maximum allocated amount of uplink resources for uplink data transmissions on the E-DCH is signaled from a base station to the mobile terminal via a shared channel or a dedicated channel.

22. The method according to claim 1, wherein the uplink maximum transmission power ratio is a maximum power ratio of a data channel to a control channel for uplink transmissions.

23. A mobile communication system for communicating information relating to the scheduling of uplink data transmissions, wherein the communication system comprises:
a plurality of base stations; and
a mobile terminal that transmits uplink data on an Enhanced Uplink Dedicated Channel (E-DCH) of a Universal Mobile Telecommunication System (UMTS) to said plurality of base stations during soft handover of the mobile terminal in the mobile communication system,
wherein at least one scheduling base station of said plurality of base stations schedules uplink data transmissions of the mobile terminal in soft handover,
wherein the at least one scheduling base station of said plurality of base stations determines scheduling information for the mobile terminal indicative of an allocated maximum amount of uplink resources for the mobile terminal applicable to scheduled uplink data transmissions on the E-DCH by the mobile terminal and transmits scheduling information to at least one other base station of the plurality of base stations to inform the at least one other base station on the mobile terminal's allocated maximum amount of uplink resources for uplink data transmissions on the E-DCH, and
wherein the at least one other base station schedules at least one other mobile terminal in communication with a respective base station based on the scheduling information received from the at least one scheduling base station
wherein the at least one scheduling base station determines at new scheduling information for the mobile terminal indicative of a new allocated maximum amount of uplink resources allocated to the mobile terminal for uplink data transmission on the E-DCH,
wherein the at least one scheduling base station signals the determined new scheduling information to the mobile terminal in soft handover to allocate to the mobile terminal the new maximum amount of uplink resources applicable on the E-DCH for uplink data transmissions, and
wherein said other base stations are informed on the allocated new amount of uplink resources, if a difference between the new mobile terminal's allocated maximum amount of uplink resources for uplink data transmissions on the E-DCH and the previous mobile terminal's allocated maximum amount of uplink resources for uplink data transmissions on the E-DCH is larger than a predetermined threshold value.

24. The mobile communication system according to claim 23, wherein the at least one scheduling base station transmits the determined scheduling information to the mobile terminal in soft handover to allocate the maximum amount of uplink resources for uplink data transmissions on the E-DCH to the mobile terminal.

25. The mobile communication system according to claim 24, wherein the other base stations of said plurality of base stations schedule at least one other mobile terminal in communication with a respective base station taking into account the indicated mobile terminal's allocated maximum amount of uplink resources for uplink data transmissions on the E-DCH for said mobile terminal in soft handover.

26. A method for communicating information relating to the scheduling of uplink data transmissions, wherein a mobile terminal transmits uplink data via an Enhanced Uplink Dedicated Channel (E-DCH) of a Universal Mobile Telecommunication System (UMTS) to a plurality of base stations during soft handover of the mobile terminal in a mobile communication system, and wherein at least one scheduling base station of said plurality of base stations schedules uplink data transmissions of the mobile terminal in soft handover, the method comprising:

determining, at the at least one scheduling base station of said plurality of base stations, scheduling information for the mobile terminal indicative of a maximum amount of uplink resources allocated to the mobile terminal for scheduled uplink data transmissions on the E-DCH by the mobile terminal, transmitting, from the at least one scheduling base station, the scheduling information to at least one other base station of said plurality of base stations to inform the at least one other base station on the mobile terminal's allocated maximum amount of uplink resources for uplink data transmissions on the E-DCH, wherein each of said base stations schedules uplink data transmissions of the mobile terminal in soft handover to the respective one of said plurality of base stations, wherein each of the plurality of base stations determines scheduling information for the mobile terminal indicative of an allocated maximum amount of uplink resources for uplink data transmission on the E-DCH allocated to the mobile terminal by the respective base station, and signals the determined scheduling information to the mobile terminal in soft handover to allocate the maximum amount of uplink resources for uplink data transmissions using the E-DCH to the terminal for uplink data transmission to the respective base station, and wherein each of the plurality of base stations indicates its maximum amount of uplink resources for uplink data transmissions on the E-DCH allocated to the mobile terminal to a serving radio network controller and at least a subset of the plurality of base stations schedules at least one mobile terminal in communication with the respective base station taking into account a combined value or a lowest value of a maximum amount of uplink resources for uplink data transmissions on the E-DCH signaled to the respective base station from the serving radio network controller.

27. The method according to claim 26, further comprising determining at the serving radio network controller a combined value or a lowest value of a maximum amount of uplink resources based on the maximum amounts of allocated resources indicated by the plurality of base stations and signaling the combined value or the lowest value of a maximum amount of uplink resources for uplink data transmissions on the E-DCH from the serving radio network controller to a subset of said plurality of base stations.

28. The method according to claim 27, wherein the combined value or the lowest value of a maximum amount of uplink resources is signaled to those base stations having indicated a maximum amount of uplink resources for uplink data transmissions using the E-DCH different from the combined value or the lowest value.

\* \* \* \* \*